(12) United States Patent
Asai et al.

(10) Patent No.: US 11,086,304 B2
(45) Date of Patent: Aug. 10, 2021

(54) SUBSTRATE PROCESSING IN A PROCESS CHAMBER FOR SEMICONDUCTOR MANUFACTURING AND APPARATUS MANAGEMENT CONTROLLER WITH ERROR ANALYSIS

(71) Applicant: HITACHI KOKUSAI ELECTRIC INC., Tokyo (JP)

(72) Inventors: Kazuhide Asai, Toyama (JP); Kazuyoshi Yamamoto, Toyama (JP); Takayuki Kawagishi, Toyama (JP); Hidemoto Hayashihara, Toyama (JP); Kayoko Yashiki, Toyama (JP); Hiroyuki Iwakura, Toyama (JP)

(73) Assignee: KOKUSAI ELECTRIC CORPORATION, Tokyo (JP)

( * ) Notice: Subject to any disclaimer, the term of this patent is extended or adjusted under 35 U.S.C. 154(b) by 255 days.

(21) Appl. No.: 15/472,736

(22) Filed: Mar. 29, 2017

(65) Prior Publication Data
US 2017/0300044 A1 Oct. 19, 2017

(30) Foreign Application Priority Data

Apr. 19, 2016 (JP) .............................. JP2016-083823
Feb. 10, 2017 (JP) .............................. JP2017-023149

(51) Int. Cl.
*G05B 19/418* (2006.01)

(52) U.S. Cl.
CPC ................. *G05B 19/41875* (2013.01); *G05B 2219/32096* (2013.01); *G05B 2219/37224* (2013.01); *G05B 2219/45031* (2013.01); *Y02P 90/02* (2015.11)

(58) Field of Classification Search
CPC .... G05B 19/41875; G05B 2219/32096; G05B 2219/45031; G05B 2219/37224; Y02P 90/22; Y02P 90/20
See application file for complete search history.

(56) References Cited

U.S. PATENT DOCUMENTS 10,289,781 B2  5/2019  Koshimaki et al.
2001/0036676 A1*  11/2001  Mitsuhashi ........... B24B 37/013
                                                                              438/8

(Continued)

FOREIGN PATENT DOCUMENTS

CN      105247657 A      1/2016
JP      07-160326 A      6/1995

(Continued)

OTHER PUBLICATIONS

"English Machine Translation" of WO-2014189045-A1 (Year: 2014).*

(Continued)

*Primary Examiner* — Kenneth M Lo
*Assistant Examiner* — Jonathan Michael Skrzycki
(74) *Attorney, Agent, or Firm* — Volpe Koenig

(57) ABSTRACT

A substrate processing apparatus includes an operating unit for transmitting apparatus data to a memory, the apparatus data being required while a recipe for processing a substrate is executed; and a data matching unit for comparing the apparatus data stored in the memory. When an error occurs in the substrate processing apparatus, the operating unit transmits data representing the error to the data matching unit. The data matching unit includes: a selection unit for selecting first apparatus data which was acquired when the recipe was executed without an occurrence of the error, and stored in the memory; an acquisition unit for acquiring first and second apparatus data from the memory, the first apparatus data being acquired when an error did not occur and the second apparatus data being acquired when an error (Continued)

occurred; and a calculation unit for comparing the first and second apparatus data and calculating a difference therebetween.

12 Claims, 20 Drawing Sheets

(56) References Cited

U.S. PATENT DOCUMENTS

| | | | | |
|---|---|---|---|---|
| 2002/0013007 | A1* | 1/2002 | Hasegawa | B24B 49/12 438/8 |
| 2007/0061088 | A1* | 3/2007 | Ganesan | G01N 29/14 702/30 |
| 2011/0311125 | A1* | 12/2011 | Konishi | G06T 7/0004 382/149 |
| 2016/0078163 | A1* | 3/2016 | Koshimaki | G06F 17/5045 716/139 |
| 2016/0239756 | A1* | 8/2016 | Aggour | G05B 23/0229 |
| 2016/0264173 | A1 | 9/2016 | Goto | |

FOREIGN PATENT DOCUMENTS

| | | |
|---|---|---|
| JP | 2002-358120 A | 12/2002 |
| JP | 2005-284405 A | 10/2005 |
| JP | 2008-052577 A | 3/2008 |
| JP | 2008-130755 A | 6/2008 |
| JP | 2009-054843 A | 3/2009 |
| JP | 2009-283580 A | 12/2009 |
| JP | 4587753 B2 | 11/2010 |
| JP | 2011-008756 A | 1/2011 |
| JP | 2011-044458 A | 3/2011 |
| JP | 2012-150721 A | 8/2012 |
| WO | 2014/189045 A1 | 11/2014 |
| WO | 2015/076173 A1 | 5/2015 |

OTHER PUBLICATIONS

"English Machine Translation" of JP2008130755, Tsutomu Iida et al., Pub 2008. Retrieved from the Internet <URL: https://patents.google.com/patent/JP2008130755A/en?oq=jp2008130755> (Year: 2008).*

Korean Office Action dated Jun. 7, 2018 for the Korean Patent Application No. 10-2017-0025274.

Japanese Office Action dated Jul. 29, 2019 for the Japanese Patent Application No. 2017-023149.

Chinese Office Action dated Oct. 19, 2020 for Chinese Patent Application No. 201710121687.8.

Chinese Office Action dated Feb. 3, 2020 for the Chinese Patent Application No. 201710121687.8.

Korean Office Action dated Mar. 27, 2020 for the Korean Patent Application No. 10-2019-0036182.

Korean Office Action dated Mar. 27, 2020 for the Korean Patent Application No. 10-2019-0036185.

Korean Office Action dated Mar. 27, 2020 for the Korean Patent Application No. 10-2019-0036190.

* cited by examiner

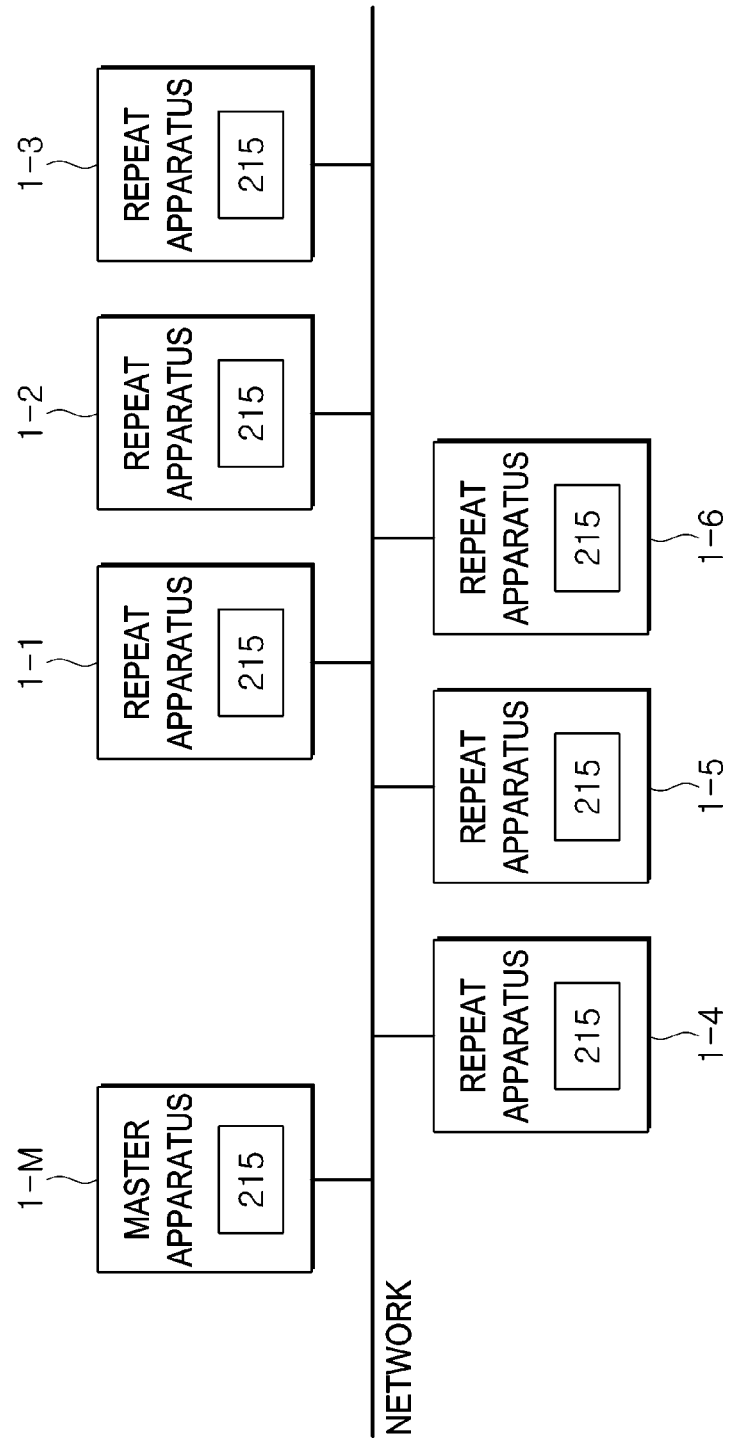

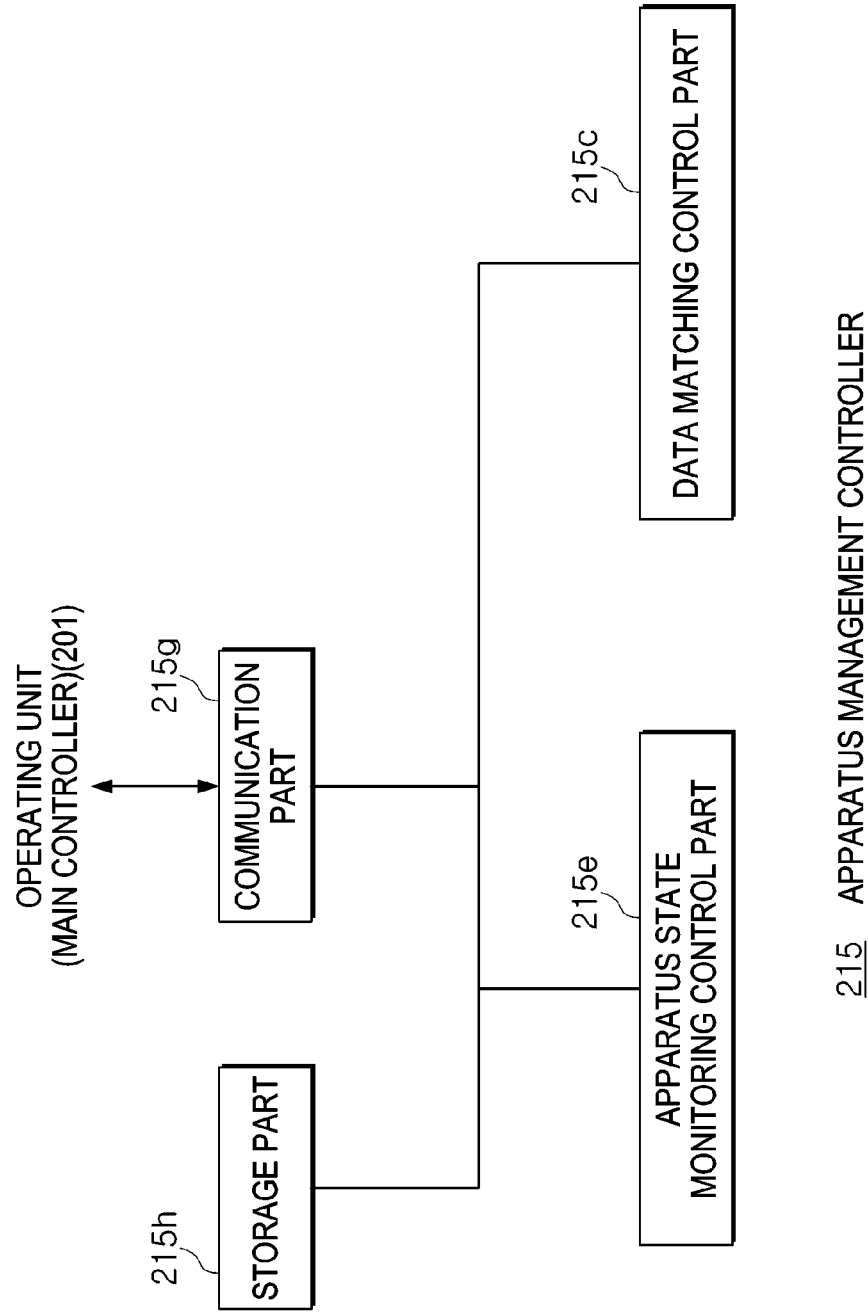

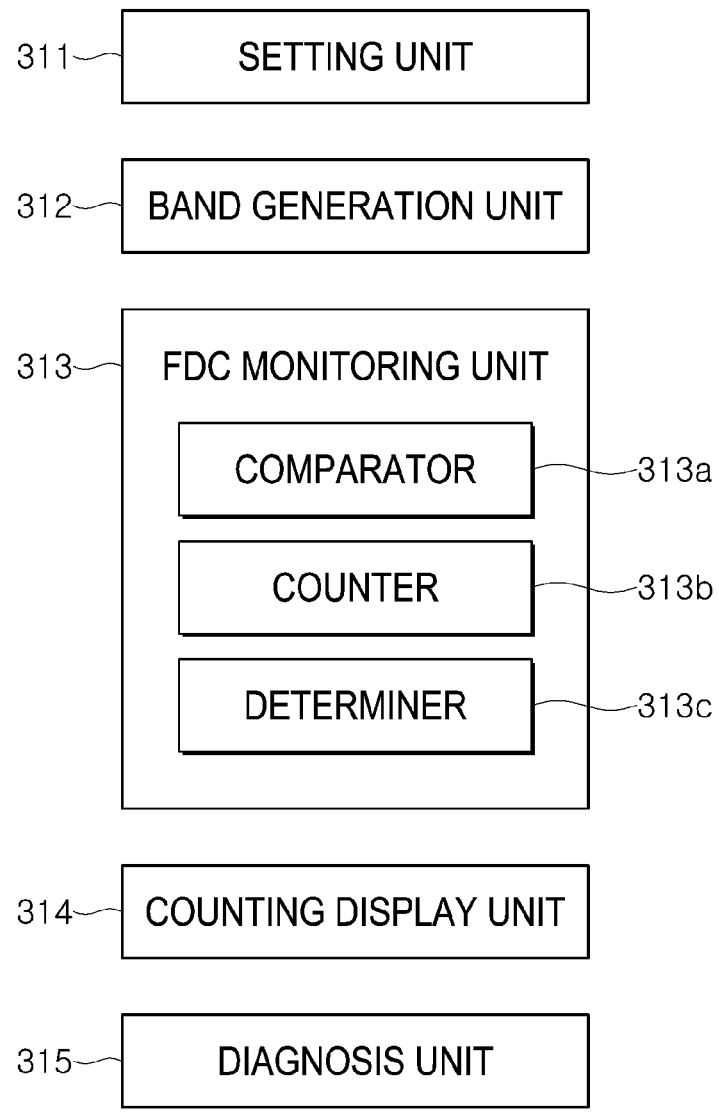

215c  DATA MATCHING CONTROL PART

FIG. 9

| APPARATUS DATA (500 OR MORE KINDS) |
|---|
| · TEMPERATURE / HEATER POWER / PRESSURE(4ch) |
| · MFC(64ch, INCLUDING OPENING DEGREE/VALVE VOLTAGE) |
| · APC OPENING DEGREE |
| · AUX(228ch INCLUDING SENSOR) |
| · $O_2$ CONCENTRATION (INCLUDING SENSOR POSITION INFORMATION) |
| · ABSOLUTE PRESSURE MONITOR / EXTERNAL COMBUSTION TEMPERATURE / SHAFT |
| · POSITION/SPEED/TORQUE(CZ,CS,CX,CR,Y,Z,V,X,E,R,BY-1,BY-2,BZ-1,BZ-2) |
| · VALVE(128ch) / SIGNAL(64ch) |

FIG. 13

| Group | Item | Step | Matching |
|---|---|---|---|
| Press | VG13 (Actual_VG13_10Hz) | ATM_DELAY | 0.00% |
| Temp | U (Actual_U) | A_PUMP | 0.00% |
| Press | VG13 (Actual_VG13_10Hz) | B_UNLOAD | 2.23% |
| Temp | L (Actual_CL) | START | 6.93% |
| Temp | U (Actual_U) | S_PUMP3 | 64.52% |
| Temp | U (Actual_U) | BASE_CHK | 69.69% |
| Temp | U (Actual_U) | M_PUMP | 81.59% |
| Temp | U (Actual_U) | DEPO1 | 85.22% |
| Press | VG13 (Actual_VG13_10Hz) | DEPO1 | 85.31% |
| Temp | CL (Actual_CL) | DEPO1 | 86.69% |

FIG. 15

| No. | |
|---|---|
| 1 | PERFORMANCE EVALUATION WAVEFORM |
| 2 | TEMPERATURE RISING WAVEFORM |
| 3 | DECOMPRESSION WAVEFORM |
| 4 | LEAK CHECK WAVEFORM |
| 5 | FILM FORMING WAVEFORM |
| ... | ... |

FIG. 16

| Contects List |
|---|
| Recipe |
| EEQA-TEMP |
| EEQA-PRESS |
| N2Recovery |
| |
| |
| |
| |
| |
| |

| Check Date | | Matching Rate |
|---|---|---|
| 10/16/2015 19:20 | | 83% |
| 10/15/2015 19:20 | | 82% |
| 10/14/2015 19:20 | | 83% |
| 10/13/2015 19:20 | | 85% |
| 10/12/2015 19:20 | | 82% |
| 10/11/2015 19:20 | | 76% |
| 10/10/2015 19:20 | | 73% |
| 10/09/2015 19:20 | | 62% |
| | | |
| | | |

FIG. 17

| | U | CU | C | CL | L | |
|---|---|---|---|---|---|---|
| <80% | 17 | 20 | 18 | 20 | 20 | |
| >80% | 3 | 0 | 2 | 0 | 0 | |
| Total | 20 | 20 | 20 | 20 | 20 | |
| STAND | 100.0% | 100.0% | 100.0% | 100.0% | 100.0% | |
| B_UP | 22.5% | 100.0% | 88.0% | 88.0% | 88.0% | |
| SP1 | 24.7% | 100.0% | 80.0% | 81.2% | 82.6% | |
| MP1 | 88.0% | 100.0% | 64.2% | 88.0% | 88.0% | |
| MP2 | : | : | : | : | : | |
| LCHK | 88.0% | 100.0% | 88.0% | 88.0% | 88.0% | |
| SP1 | 24.7% | 100.0% | 80.0% | 81.2% | 82.6% | |
| MP1 | 88.0% | 100.0% | 64.2% | 88.0% | 88.0% | |
| MP2 | : | : | : | : | : | |
| LCHK | 88.0% | 100.0% | 88.0% | 88.0% | 88.0% | |

Matching Rate  84%  Trace

SUBSTRATE PROCESSING IN A PROCESS CHAMBER FOR SEMICONDUCTOR MANUFACTURING AND APPARATUS MANAGEMENT CONTROLLER WITH ERROR ANALYSIS

CROSS-REFERENCE TO RELATED PATENT APPLICATION

This non-provisional U.S. patent application claims priority under 35 U.S.C. § 119 of Japanese Patent Application No. 2016-083823, filed on Apr. 19, 2016 and Japanese Patent Application No. 2017-023149, filed on Feb. 10, 2017, the entire contents of which are hereby incorporated by reference.

BACKGROUND

1. Field

The present disclosure relates to a substrate processing apparatus, and an apparatus management controller.

2. Description of the Related Art

In the semiconductor manufacturing field, information of an apparatus such as a substrate processing apparatus is stored in a server in order to improve the operating rate or production efficiency of the apparatus. The stored information may be used to analyze a trouble of the apparatus or monitor the state of the apparatus. In this specification, "trouble" indicates an error situation which may occur when a film is formed by the above-described apparatus or an error situation which may occur when the apparatus is stopped due to a breakdown.

When a method of specifying the cause of a trouble, i.e. a method of analyzing a trouble according to the related art is applied to the apparatus which retains a large amount of data while processing a substrate, the method exhibits low efficiency. Furthermore, the method requires a considerable time until the cause of the trouble is specified, and uses a large amount of data to specify the cause of the trouble. Therefore, the method of specifying the cause of a trouble according to the related art may output a different result, depending on the ability of a maintenance engineer who analyzes the trouble. When a confirmation of important data is omitted, the cause of a trouble may not be specified even though the method of analyzing a trouble according to the related art is analyzed. Therefore, in order to improve the operating rate of the apparatus by rapidly specifying the cause of an error when analyzing a trouble, a variety of methods have been tried.

For example, a related art discloses a method of collectively comparing files used in a substrate processing apparatus connected to a management device, and correcting a comparison difference between the files when the comparison difference is extracted. Furthermore, another related method discloses a method of comparing files between recipes, for example, files of process recipes A and B. The function of comparing the files can easily extract different data between the files. The method of analyzing a trouble using the function of comparing files can improve the efficiency of the process of specifying the cause of an error.

SUMMARY

The present disclosure provides some embodiments of a technique capable of shortening a time required for analyzing an error.

According to one aspect described herein, a substrate processing apparatus may include: an operating part configured to transmit apparatus data to a storage part, the apparatus data being required while a recipe for processing a substrate is executed; and a data matching control part configured to compare the apparatus data stored in the storage part. When an error occurred in the substrate processing apparatus, the operating part may transmit data representing the error to the data matching control part, and the data matching control part may include: a selection unit configured to select one or more recipes executed under a same condition as the recipe executed with the error from the storage unit; an acquisition unit configured to acquire the apparatus data of the recipe executed with the error and the apparatus data of the one or more recipes selected by the selection unit; and a calculation unit configured to compare the apparatus data of the recipe executed with the error and the apparatus data of at least of the recipes selected by the selection unit, wherein on the basis of the data representing the error, the data matching control part configured to match a first apparatus data of a recipe executed just before the recipe executed with the error among the one or more recipes selected by the selection unit and a second apparatus data of the recipe executed with the error.

BRIEF DESCRIPTION OF THE DRAWINGS

FIG. 5 is a diagram exemplifying a configuration of a substrate processing system including the substrate processing apparatus according to the embodiment described herein.

FIG. 6 is a diagram exemplifying a configuration of an apparatus management controller of the substrate processing apparatus according to the embodiment described herein.

FIG. 7A is a diagram exemplifying a configuration of an apparatus state monitoring control part of the substrate processing apparatus according to the embodiment described herein.

FIG. 9 is a diagram exemplifying apparatus data which are file comparison targets in the substrate processing apparatus according to the embodiment described herein.

FIG. 13 is a table illustrating an example in which apparatus data are displayed in ascending order of matching rate, in the substrate processing apparatus according to the embodiment described herein.

FIG. 15 exemplifies a waveform table for performance evaluation in the substrate processing apparatus described herein.

FIG. 16 exemplifies a matching history screen in the substrate processing apparatus according to the embodiment described herein.

FIG. 17 exemplifies a data detail display screen in the substrate processing apparatus according to the embodiment described herein.

DETAILED DESCRIPTION

<Overview of Substrate Processing Apparatus>

Figure 1:
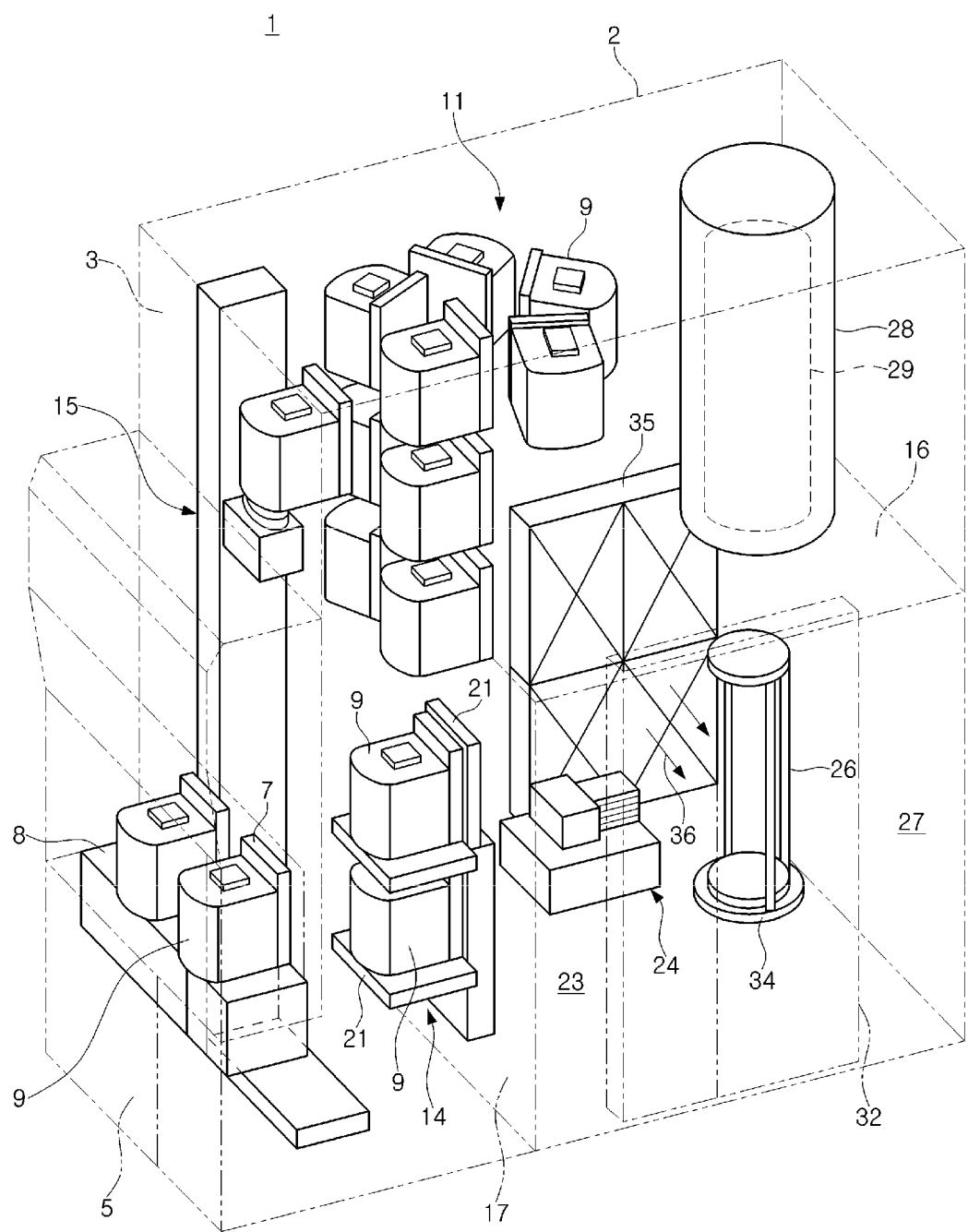
FIG. 1 is a diagram schematically illustrating a configuration of a substrate processing apparatus according to an embodiment described herein.
Figure 2:
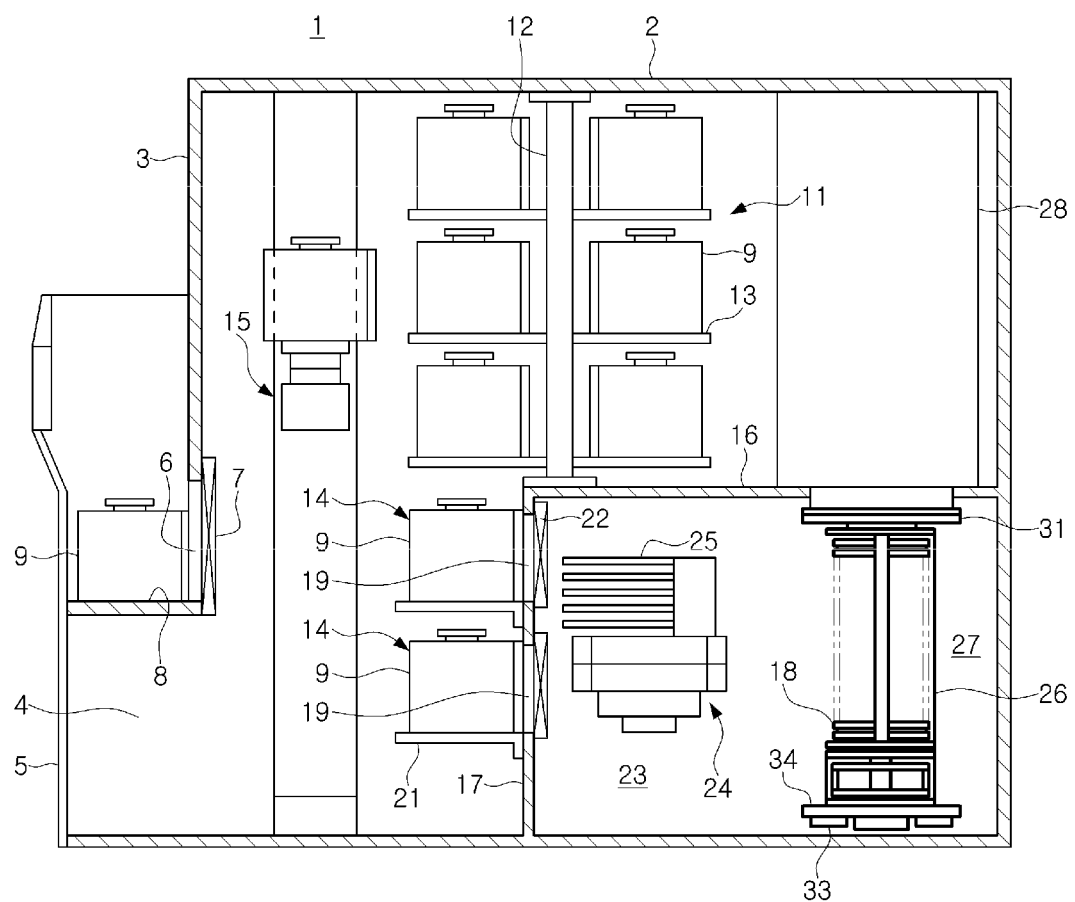
FIG. 2 is a diagram illustrating a vertical cross-section of the substrate processing apparatus according to the embodiment described herein.

Hereafter, an embodiment will be described with reference to the accompanying drawings. First, referring to FIGS. 1 and 2, a substrate processing apparatus 1 according to an embodiment will be described. In this specification, the substrate processing apparatus 1 is also simply referred to as "apparatus 1".

The apparatus 1 includes a housing 2. An opening (front maintenance port) 4 is disposed at the bottom of a front wall 3 of the housing 2 and is opened/closed by a front maintenance door 5.

A pod loading/unloading port 6 is disposed at the front wall 3 of the housing 2 so as to connect the inside and outside of the housing 2. The pod loading/unloading port 6 is opened/closed by a front shutter 7. A load port 8 is installed in front of the pod loading/unloading port 6. A pod 9 may be placed on the load port 8 while the position thereof is adjusted.

The pod 9 includes an airtight substrate transfer vessel. The pod 9 may be loaded into the load port 8 or unloaded out of the load port 8 by an in-process conveyance device (not shown).

A rotary pod shelf 11 is installed at the upper portion of a roughly central portion between the front and back sides of the housing 2. The rotary pod shelf 11 can store a plurality of pods 9.

The rotary pod shelf 11 includes a pillar 12 which is installed vertically and rotated intermittently and a plurality of shelf boards 13 which are radially supported by the pillar 12 at the upper, middle and lower stages of the pillar 12. The plurality of pods 9 are placed and stored on each of the shelf boards 13.

A pod opener 14 is installed under the rotary pod shelf 11. The pod 9 may be placed on the pod opener 14. The pod opener 14 may open/close the lid of the pod 9.

A pod transfer mechanism 15 is installed among the loading port shelf 8, the rotary pod shelf 11 and the pod opener 14. The pod transfer mechanism 15 may be moved up and down or moved horizontally, while supplying the pod 9. The pod transfer mechanism 15 may transfer the pod 9 among the loading port shelf 8, the rotary pod shelf 11 and the pod opener 14.

A sub-housing 16 is installed at the lower portion of the roughly central portion between the front and back sides of the housing 2. A pair of wafer loading/unloading ports 19 is vertically installed at a front wall 17 of the sub-housing 16, in order to load a wafer 18 into the sub-housing 16 or unload the wafer 18 out of the sub-housing 16. Hereafter, the wafer 18 may also be referred to as a substrate. The pair of wafer loading/unloading ports 19 is vertically installed in two stages at the front wall 17 of the sub-housing 16. The pod opener 14 is installed at each of the pair of wafer loading/unloading ports 19.

The pod opener 14 includes a placing table 21 having the pod 9 placed thereon and an opening/closing mechanism 22 for opening/closing the lid of the pod 9. The pod opener 14 opens/closes a wafer entrance/exit port (not illustrated) of the pod 9 by opening/closing the lid of the pod 9 placed on the placing table 21 using the opening/closing mechanism 22.

The sub-housing 16 has an airtight transfer chamber 23 serving as a space in which the pod transfer mechanism 15 or the rotary pod shelf 11 is installed (pod transfer space). A wafer transfer mechanism (substrate transfer mechanism) 24 is installed in the front region of the transfer chamber 23. The substrate transfer mechanism 24 includes a wafer placing plate 25 configured to place a plurality of substrates 18 (five substrates in the example of FIG. 2). The wafer placing plate 25 may be moved in the horizontal direction, rotated in the horizontal direction, and lifted/lowered in the vertical direction. The substrate transfer mechanism 24 may load the substrate 18 into a boat (substrate support) 26 and unload the substrate 18 from the boat 26.

A waiting part 27 is disposed at the rear region of the transfer chamber 23. The boat 26 is accommodated in the waiting part 27 and waits in the waiting part 27. A vertical processing furnace 28 is installed above the waiting part 27. The processing furnace 28 includes a process chamber 29 installed therein. The process chamber 29 has a furnace opening at the lower end thereof. The furnace opening may be opened/closed by a furnace opening shutter 31.

A boat elevator 32 is installed between the right end of the housing 2 and the right end of the waiting part 27 of the sub-housing 16. The boat elevator 32 is an elevating mechanism for elevating the boat 26. A seal cap 34 serving as a lid body is horizontally attached to an arm 33 connected to an elevating base of the boat elevator 32. The seal cap 34 vertically supports the boat 26. With the boat 26 loaded in the process chamber 29, the seal cap 34 can air-tightly seal the furnace opening.

The boat 26 is configured to horizontally support a plurality of substrates 18 (for example, 50 to 125 substrates) while the plurality of substrates 18 are centered with each other.

A clean unit 35 is installed at a position facing the boat elevator 32. The clean unit 35 can supply clean air 36 as a cleaned atmosphere or inert gas. The clean unit 35 includes a supply fan (not illustrated) and a dustproof filter (not illustrated).

The clean air 36 blown through the clean unit 35 flows along the substrate transfer mechanism 24 and the boat 26, and is sucked by a duct (not illustrated). Then, the clean air 36 may be exhausted to the outside of the housing 2 or blown into the transfer chamber 23 by the clean unit 35.

Next, the operation of the apparatus 1 will be described.

When a pod 9 is placed on the loading port shelf 8, the pod loading/unloading port 6 is opened by the front shutter 7. The pod 9 on the loading port shelf 8 is loaded into the housing 2 through the pod loading/unloading port 6 by the pod transfer mechanism 15, and placed on a designated shelf board 13 of the rotary pod shelf 11. The pod 9 is temporarily stored in the rotary pod shelf 11, and then transferred to the placing table 21 of any one pod opener 14 from the shelf board 13 by the pod transfer mechanism 15 or directly transferred to the placing table 21 from the loading port shelf 8.

At this time, the wafer loading/unloading port 19 is closed by the opening/closing mechanism 22. The clean air 36 is supplied to the transfer chamber 23 so as to fill the transfer chamber 23. Since the transfer chamber 23 is filled with the clean air 36 which is nitrogen gas, the oxygen concentration of the transfer chamber 23 is lower than the oxygen concentration of the housing 2.

The opening-side end surface of the pod 9 placed on the placing table 21 is pressed against the edge portion of the opening of the wafer loading/unloading port 19 disposed at the front wall 17 of the sub-housing 16, and the lid of the pod 9 is removed by the opening/closing mechanism 22. Therefore, the wafer entrance/exit port (not illustrated) of the pod 9 is opened.

When the pod 9 is opened by the pod opener 14, the substrate 18 is discharged from the pod 9 by the substrate transfer mechanism 24, and transferred to the notch alignment device (not illustrated). The position of the substrate 18 is aligned by the notch alignment device. Then, the substrate transfer mechanism 24 loads the substrate 18 into the waiting station 27 at the rear of the transfer chamber 23, and then loads the substrate 18 into the boat 26.

After loading the substrate 18 into the boat 26, the substrate transfer mechanism 24 returns to the pod 9, and then loads the next substrate 18 to the boat 26.

While the substrate transfer mechanism 24 loads the substrate 18 to the boat 26 from the pod 9 placed on any one of the upper and lower pod openers 14, the pod transfer mechanism 15 transfers another pod 9 to the other pod opener 14 from the rotary pod shelf 11. The other pod opener 14 opens the lid of the another pod 9.

When a predetermined number of substrates 18 are loaded in the boat 26, the furnace opening shutter 31 opens the furnace opening of the processing furnace 28, which has been closed by the furnace opening shutter 31. Then, the boat 26 is moved up by the boat elevator 32, and loaded into the process chamber 29.

After the boat 26 is loaded, the seal cap 34 air-tightly closes the furnace opening. In the present embodiment, after the boat 26 is loaded, a purge step (initial purge step) may be performed to substitute the inner atmosphere of the process chamber 29 with an inert gas.

A gas exhaust mechanism (not illustrated) vacuum-exhausts the process chamber 29 such that the process chamber 29 has a desired pressure (vacuum degree). A heater driving unit (not illustrated) drives a heater (not illustrated) to heat the process chamber 29 to a predetermined temperature such that the temperature of the process chamber 29 has a desired temperature distribution.

A gas supply mechanism (not illustrated) supplies a process gas to the process chamber 29. The gas supply mechanism (not illustrated) adjusts the flow rate of the process gas to a predetermined flow rate. The processing gas with the flow rate thereof adjusted comes in contact with the surface of the substrate 18 while flowing in the process chamber 29. Then, a predetermined treatment is performed on the surface of the substrate 18. The process gas which has reacted through the contact with the surface of the substrate 18 is exhausted from the process chamber 29 by the gas exhaust mechanism (not illustrated).

After a preset processing time has elapsed, the gas supply mechanism (not illustrated) supplies an inert gas to the process chamber 29 from an inert gas supply source (not illustrated). The atmosphere of the process chamber 29 is substituted with the inert gas, and the pressure of the process chamber 29 returns to normal pressure (additional purge step). Then, the boat 26 is moved down through the seal cap 34 by the boat elevator 32.

The processed substrates 18 and the pod 9 are unloaded to the outside of the housing 2 according to the reverse sequence of the above-described sequence. Then, an unprocessed substrate 18 is loaded into the boat 26, and the above-described substrate processing is performed on the unprocessed substrate 18.

<Configuration of Control System 200>

Figure 3:
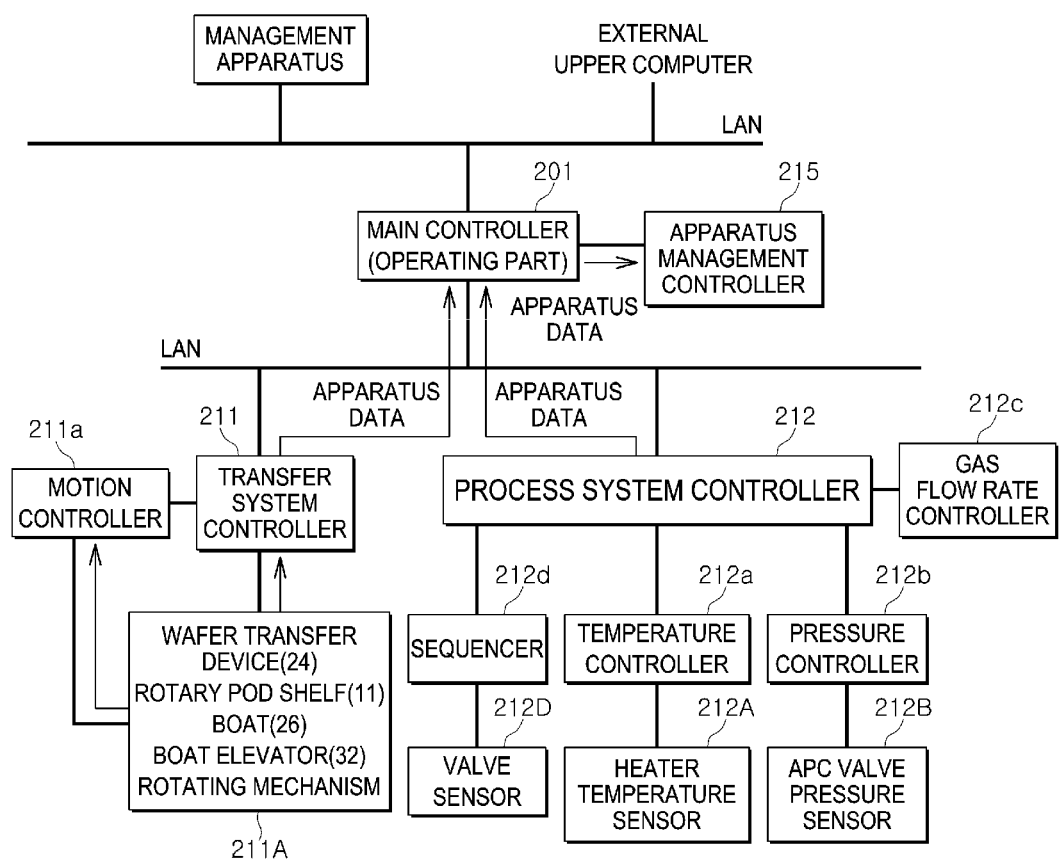
FIG. 3 is a diagram exemplifying a configuration of a control system of the substrate processing apparatus according to the embodiment described herein.

Next, referring to FIG. 3, the configuration of a control system 200 will be described. The following descriptions will be focused on a main controller 201 serving as an operating part. In this specification, the main controller 201 may be referred to as an operating part 201. As illustrated in FIG. 3, the control system 200 includes the main controller 201, a transfer system controller 211 serving as a transfer controller, a processing system controller 212 serving as a process controller and an apparatus management controller 215 serving as a data monitoring part. The apparatus management controller 215 serves as a data collection controller. The apparatus management controller 215 collects apparatus data inside and outside the apparatus 1, and monitors the integrity of apparatus data in the apparatus 1. In the present embodiment, the control system 200 is installed in the apparatus 1.

In this specification, "apparatus data" refers to data generated when the apparatus 1 is in an operating state, for example, data generated when the apparatus 1 operates each component when processing the substrate 18. For example, the data may include data (control parameter) related to substrate processing, such as a process temperature, a process pressure and a flow rate of a process gas at the time when the apparatus 1 processes the substrate 18, data related to the quality of a manufactured product substrate, such as the thickness of a formed film and an accumulated value of the thicknesses of the film, and data (set values and actual measured values) related to constituent parts of the apparatus 1, such as a quartz reaction tube, heater, valve and MFC (Mass Flow Controller).

Moreover, data collected while the apparatus 1 executes a recipe may be referred to as process data. For example, the apparatus data may include also the process data such as raw waveform data as data which are collected at each specific interval of one second until the recipe is ended, and statistical data at each step in the recipe. The statistical data include data such as a maximum value, minimum value and average value. The apparatus data may include event data indicating various apparatus events which occur when a recipe is not executed, for example, when the apparatus 1 is in an idle state where no substrates 18 are loaded into the apparatus 1. The event data may include data indicating a maintenance history.

The main controller 201 is electrically connected to the transfer system controller 211 and the processing system controller 212 through a LAN (Local Area Network) line such as 100BASE-T, for example. The main controller 201 may transmit/receive apparatus data or download/upload a file, between the transfer system controller 211 and the processing system controller 212.

The operation part 201 is provided with a port as a mounting part in/from which a recording medium (for example, a USB memory or the like) as an external storage device is inserted/removed. An OS (not illustrated) corresponding to the port is installed in the operating part 201. An upper computer may be connected to the operating part 201 through a communication network, for example. Then, even when the apparatus 1 is installed in a clean room (not illustrated), the upper computer may be installed at a position such as an office outside the clean room.

The apparatus management controller 215 is connected to the operating part 201 through a LAN line, and configured to collect apparatus data from the operating part 201, quantify an operation state of the apparatus, and display the quantified operation state on the screen. The detailed configuration of the apparatus management controller 215 will be described later.

The transfer system controller 211 is connected to a substrate transfer system 211A which mainly includes the rotary pod shelf 11, the boat elevator 32, the pod transfer mechanism 15, the substrate transfer mechanism 24, the boat 26 and a rotating mechanism (not illustrated). The transfer system controller 211 may control the transfer operations of the rotary pod shelf 11, the boat elevator 32, the pod transfer mechanism 15, the substrate transfer mechanism 24, the boat 26 and the rotating mechanism (not illustrated). In particular, the transfer system controller 211 may control the transfer operations of the boat elevator 32, the pod transfer mechanism 15 and the substrate transfer mechanism 24 through a motion controller 211a.

The processing system controller 212 includes a temperature controller 212a, a pressure controller 212b, a gas flow rate controller 212c and a sequencer 212d. The temperature controller 212a, the pressure controller 212b, the gas flow rate controller 212c and the sequencer 212d constitute a sub-controller. The temperature controller 212a, the pressure controller 212b, the gas flow rate controller 212c and the sequencer 212d may be electrically connected to the processing system controller 212, and transmit or receive apparatus data to or from the processing system controller 212, or download or upload a file from or to the processing system controller 212. In the example of FIG. 3, the processing system controller 212 and the sub-controller are illustrated separately. However, the processing system controller 212 and the sub-controller may be integrated with each other.

A heating mechanism 212A is connected to the temperature controller 212a. The heating mechanism 212A mainly includes components such as a heater and a temperature sensor. The temperature controller 212a is configured to adjust the inner temperature of the processing furnace 28 by controlling the temperature of a heater (not illustrated) in the processing furnace 28. The temperature controller 212a can perform switching (on/off) control of a thyristor (not illustrated), and control power supplied to a heater wire (not illustrated).

A gas exhaust mechanism 212B is connected to the pressure controller 212b. The gas exhaust mechanism 212B mainly includes a pressure sensor, an APC valve serving as a pressure valve, and a vacuum pump (not illustrated). The pressure controller 212b is configured to control the opening degree of the APC valve and switching (on/off) of the vacuum pump based on a pressure value sensed by the pressure sensor, such that the pressure of the process chamber 29 becomes a desired pressure at a desired timing.

The gas flow rate controller 212c is embodied by an WC (not illustrated). The sequencer 212d is configured to open/close a valve 212D to supply a gas through a process gas supply pipe or purge gas supply pipe or to stop the gas supply. The processing system controller 212 is configured to control the WC 212c and the valve 212D such that the flow rate of gas supplied into the process chamber 29 becomes a desired flow rate at a desired timing.

The main controller 201, the transfer system controller 211, the processing system controller 212 and the apparatus management controller 215 according to the present embodiment may be embodied by a dedicated system or typical computer system. The main controller 201, the transfer system controller 211, the processing system controller 212 and the apparatus management controller 215 may be embodied by installing a program into a general purpose computer using a recording medium (for example, USB key) which stores the program for executing the above-described process, thereby performing a predetermined process.

The program may be supplied through various methods. The various methods may include a method of supplying the program through a component such as a communication line, communication network and communication system as well as the above-described method of supplying the program via a predetermined recording medium. For example, the program may be posted to a bulletin board of the communication network, and provided by a carrier wave via a network. By starting the provided program and executing the program in the same manner as other application programs under control of the OS, the apparatus 1 can perform a predetermined process on the substrate 18.

<Configuration of Main Controller 201>

Figure 4:
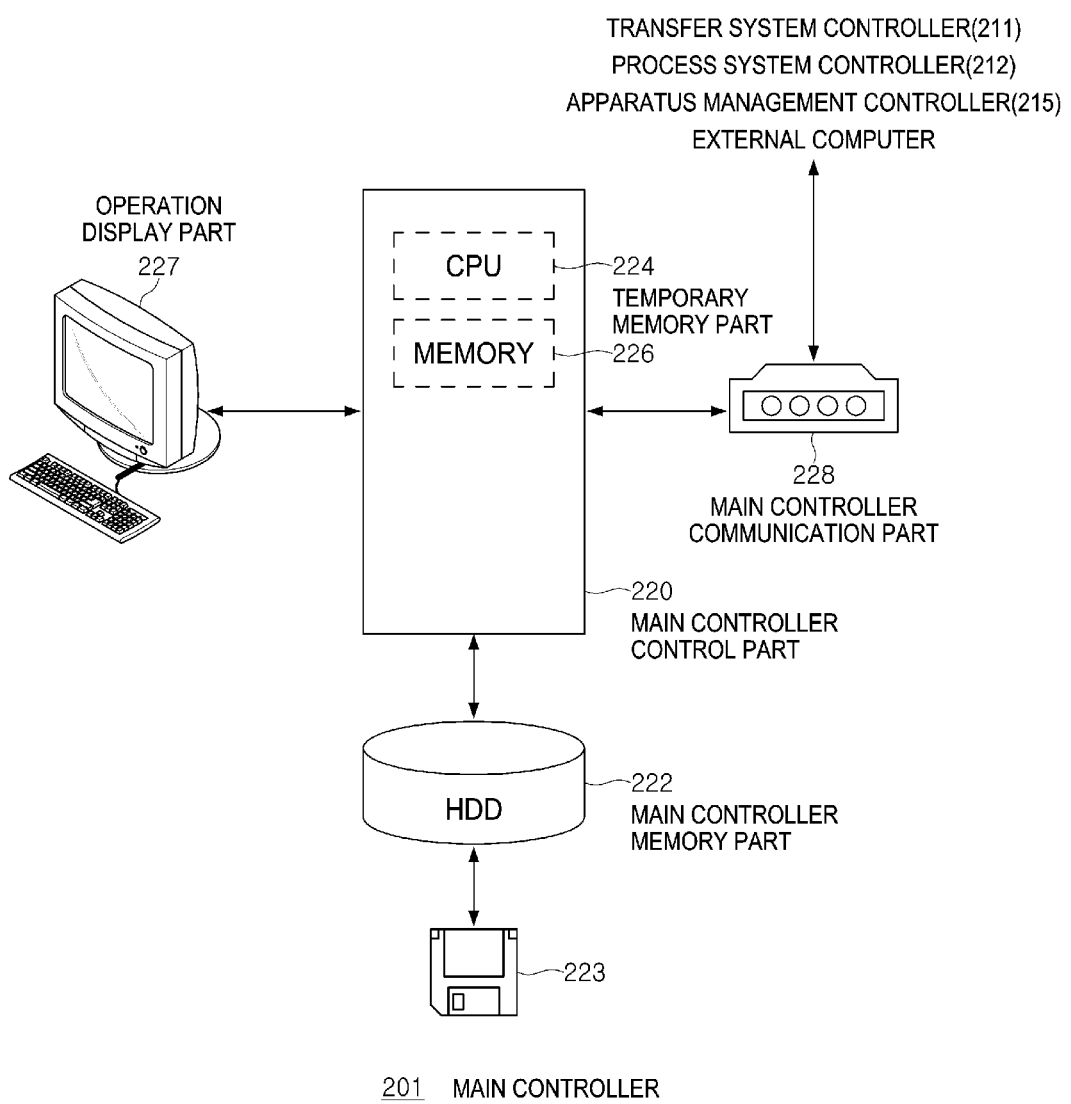
FIG. 4 is a diagram exemplifying a configuration of a main controller of the substrate processing apparatus according to the embodiment described herein.

Next, the configuration of the main controller 201 will be described with reference to FIG. 4.

The main controller 201 includes a main controller control part 220, a HDD (Hard Disk Drive) 222, an operation display part 227 and a main controller communication part 228. The HDD 222 serves as a main controller storage part, the operation display part 227 includes a display part for displaying various pieces of information and an input unit for receiving various instructions from an operator, and the main controller communication part 228 serves as a transmitting/receiving module to communicate with the inside and outside of the apparatus 1. In this specification, "operator" may indicate an apparatus manager, an apparatus engineer, a maintenance engineer and a worker as well as an apparatus operator. The main controller control part 220 includes a CPU 224 serving as a processing part and a memory 226 serving as a temporary memory part such as RAM and ROM, and is embodied by a computer having a clock function (not illustrated).

For example, a recipe file such as a recipe defining the processing conditions and sequence of a substrate, a control program file for executing the recipe file, a parameter file defining a parameter for executing the recipe file, an error processing program file, and an error processing parameter file defining a parameter for processing an error may be stored in the HDD 222. In addition, various icon files (not illustrated) and various screen files (not illustrated) including an input screen for inputting a process parameter may be stored in the HDD 222.

The operation display part 227 may include an operation screen in which various operating buttons (not illustrated) are installed. The various operating buttons serve as an input part for inputting an operation instruction to the substrate transfer system 211A or the substrate processing system illustrated in FIG. 3, the substrate processing system including the heating mechanism 212A, the gas exhaust mechanism 212B and the gas supply system 212C.

The operation screen (not illustrated) for operating the apparatus 1 may be displayed on the operation display part 227. The operation display part 227 displays information based on apparatus data generated in the substrate processing apparatus 100, through the operation screen. The operation screen of the operation display part 227 includes a touch panel using liquid crystal, for example. The operation display part 227 receives data (input instruction) inputted by an operator through the operation screen, and transmits the input instruction to the main controller 201. The operation display part 227 receives an instruction (control instruction) to execute a recipe stored in the memory 226 or a substrate processing recipe selected among a plurality of recipes stored in the main controller storage part 222, and transmits the control instruction to the main controller control part 220. Hereafter, the substrate processing recipe may also be referred to as "process recipe".

In the present embodiment, the apparatus management controller 215 is started to execute the above-described program. The apparatus management controller 215 is configured to read screen files and data tables which are stored in advance, read apparatus data, and display a screen on the operation display part 227, the screen indicating the operating state of the apparatus.

A component such as a switching hub (not illustrated) is connected to the main controller communication part 228. The main controller 201 is configured to transmit or receive data to or from a component such as an external computer and another controller in the apparatus 1 through the switching hub and a network, for example.

The main controller 201 transmits apparatus data such as a state of the apparatus 1 to an external upper computer, for example, a host computer through the network (not illustrated). The control system 200 controls the substrate processing operation of the apparatus 1, based on the recipe files and the parameter files which are stored in the main controller memory part 222.

<Substrate Processing>

Next, substrate processing will be described, the substrate processing including a predetermined processing step which is performed by the substrate processing apparatus according to the present embodiment, that is, the apparatus 1. At this time, a substrate processing step which is one of processes for manufacturing a semiconductor substrate (for example, a film forming step in the present embodiment) will be exemplified as the predetermined processing step.

When the apparatus 1 performs the substrate processing, a substrate processing recipe (process recipe) corresponding to the substrate processing is stored in the memory (not illustrated) such as RAM in the processing system controller 212, for example. If necessary, the main controller 201 transmits an operation instruction to the processing system controller 212 or the transfer system controller 211. The substrate processing performed by the apparatus 1 includes at least a loading step, a film forming step and an unloading step.

<Transfer Step>

The main controller 201 generates an instruction for driving the substrate transfer mechanism 24, and transmits the generated instruction to the transfer system controller 211. According to the instruction of the transfer system controller 211, the substrate transfer mechanism 24 starts a process of transferring the substrate 18 to the boat 26 from the pod 9 placed on the placing table 21, that is, a transfer process. The transfer process is performed until a predetermined number of substrates 18 are all transferred to the boat 26 (wafer charging).

<Loading Step>

When the predetermined number of substrates 18 are all transferred to the boat 26, the boat 26 is moved up by the boat elevator 32 which is operated according to an instruction from the transfer system controller 211, and loaded into the process chamber 29 installed in the processing furnace 28 (boat loading). When the boat 26 is completely loaded, the seal cap 34 of the boat elevator 32 air-tightly seals the lower end of a manifold (not illustrated) of the processing furnace 28.

<Film Forming Step>

Next, the atmosphere of the process chamber 29 is vacuum-exhausted by a vacuum exhaust device according to an instruction from the pressure controller 212b, such that the process chamber 29 has a predetermined film forming pressure (vacuum degree). The atmosphere of the process chamber 29 is heated to a predetermined temperature by the heater (not illustrated), according to an instruction from the temperature controller 212a. Then, according to an instruction from the transfer system controller 211, the rotating mechanism starts to rotate the boat 26 and the substrate 18. By supplying a predetermined gas (process gas) to the plurality of substrates 18 supported in the boat 26 with the process chamber 29 retained at a predetermined pressure and temperature, a predetermined process (for example, film forming process) is performed on the substrates 18. Before an unloading step described later is performed, a temperature lowering step may be performed to lower the temperature of the process chamber 29 (temperature of the substrate 18) from the processing temperature (predetermined temperature).

<Unloading Step>

When the film forming step for the substrates 18 loaded in the boat 26 is completed, the rotating mechanism stops rotating the boat 26 and the substrate 18 according to an instruction from the transfer system controller 211. The boat elevator 32 moves down the seal cap 34 to open the lower end of the manifold (not illustrated). The boat 26 storing the processed substrates 18 therein is unloaded to the outside of the processing furnace 28 (boat unloading).

<Collecting Step>

The boat 26 storing the processed substrates 18 therein is efficiently cooled by the clean air 36 blown through the clean unit 35. When the boat 26 is cooled to 150° C. or less, for example, the processed substrates 18 are discharged fro the boat 26 (wafer discharging), and transferred to the pod 9. Then, a new unprocessed substrate 18 is transferred to the boat 26. The above-described substrate processing may be performed on the unprocessed substrate 18.

<Configuration of Substrate Processing System>

FIG. 5 is a diagram exemplifying a configuration of a substrate processing system including the apparatus 1 according to the embodiment described herein. In the substrate processing system, a master apparatus 1-M and repeat apparatuses 1-1 to 1-6 are connected to each other through a network. FIG. 5 illustrates six repeat apparatuses 1-1 to 1-6, but the number of repeat apparatuses is not limited to six. Furthermore, each of the master apparatus 1-M and the repeat apparatuses 1-1 to 1-6 is configured as a substrate processing apparatus, that is, the apparatus 1. In this specification, each of the master apparatus 1-M and the repeat apparatuses 1-1 to 1-6 may be referred to as the apparatus 1, and the master apparatus 1-M and the repeat apparatuses 1-1 to 1-6 may be collectively referred to as the apparatuses 1.

The master apparatus 1-M is an apparatus 1 including apparatus data serving as reference data. The master apparatus 1-M has the same hardware configuration as the substrate processing apparatus 1, and includes the apparatus management controller 215. The master apparatus 1-M is the first apparatus of the apparatus 1 of which the apparatus data are properly adjusted, for example. In this specification, "first-made apparatus" may indicate an apparatus 1 which was first delivered to the factory of a customer, and "repeat apparatus" may indicate an apparatus 1 which was delivered to the factory of the customer after the first-made apparatus. The repeat apparatuses 1-1 to 1-6 receive a copy of various pieces of information included in the master apparatus 1-M, for example, a copy of apparatus data from the master apparatus 1-M through the network. The received copy of the various pieces of information is stored in each of the memory parts of the repeat apparatuses 1-1 to 1-6.

In the present embodiment, the apparatus management controller 215 is installed in each of the apparatuses 1. The apparatus management controllers 215 installed in the master apparatus 1-M and the repeat apparatuses 1-1 to 1-6, respectively, are connected through the network. Therefore, the repeat apparatuses 1-1 to 1-6 can share the various pieces of information of the master apparatus 1-M. Specifically, the repeat apparatuses 1-1 to 1-6 may copy a file such as apparatus data of the master apparatus 1-M or compare the file of the master apparatus 1-M to files of the repeat apparatuses 1-1 to 1-6 (tool matching described later). Furthermore, since the repeat apparatuses 1-1 to 1-6 receive the file such as the apparatus data of the master apparatus 1-M through the network, the repeat apparatuses 1-1 to 1-6 do not need to use a separate recording medium in order to copy the apparatus data. Therefore, a maintenance engineer of an apparatus maker can easily perform a file editing operation without moving to the front of the apparatus 1 installed in the clean room.

<Functional Configuration of Apparatus Management Controller 215>

As illustrated in FIG. 6, the apparatus management controller 215 serving as a health check controller to check the health state of the apparatus 1 may be configured to quantify information on various health states of the apparatus 1, and monitor whether the apparatus 1 can continuously perform a normal operation. The information may include a time-dependent change of apparatus data from the shipment or setup of the apparatus 1, deterioration states of parts constituting the apparatus 1, and an occurrence of fault information. In this specification, "during the setup" may indicate when the apparatus 1 is first activated (power is first supplied) after being delivered to the factory of a customer.

As illustrated in FIG. 6, the apparatus management controller 215 includes a data matching control part 215c, an apparatus state monitoring control part 215e, a communication part 215g configured to transmit/receive apparatus data to/from main controller (operating part) 201, and a storage part 215h configured to store various data. Specifically, the apparatus management controller 215 includes at least the apparatus state monitoring control part 215e and the data matching control part 215c. The apparatus state monitoring control part 215e monitors the integrity of apparatus data which can be obtained from the operation states of the components constituting the apparatus, and the data matching control part 215c determines the validity of equipment data provided from factory equipment. The apparatus management controller 215 is configured to create evaluation information by evaluating the operation state of the apparatus 1, based on the apparatus state monitoring result data acquired from the apparatus state monitoring control part 215e and the validity determination result data provided by the data matching control part 215c.

The apparatus management controller 215 is configured to monitor the health condition of the apparatus 1, based on a value obtained by quantifying the evaluation information on the operation state of the apparatus 1. When the health condition of the apparatus 1 is deteriorated, the apparatus management controller 215 issues a warning by outputting an alarm sound or displaying an alarm. The apparatus management controller 215 allows the operation display part 227 of the apparatus 1 to operate functions useful for stable operation of the apparatus 1, such as a data matching function and an apparatus state monitoring function.

The apparatus management controller 215 includes a CPU (not illustrated) and a memory (not illustrated) as hardware components, the memory serving to store a program such as an operation program of the apparatus management controller 215. The CPU is operated according to the operation program. In the present embodiment, the apparatus management controller 215 is configured to include at least the apparatus state monitoring control part 215e and the data matching control part 215c. The apparatus state monitoring control part 215e stores apparatus data in the storage part 215h, the apparatus data being generated while the operation program is executed to perform a recipe for processing a substrate. When an error occurred in the apparatus 1, the data matching control part 215c matches first apparatus data which are acquired from the recipe executed just before the occurrence of the error and second apparatus data which are acquired from the recipe executed at the time of the occurrence of the error, based on data representing the error. In other words, the data matching control part 215c may match first apparatus data of the recipe executed without the error to second apparatus data of the recipe executed with the error.

Error analysis information which is used in the data matching control part 215c or apparatus data which are acquired from the master apparatus 1-M so as to be used in the apparatus state monitoring control part 215e are stored in the storage part 215h. The apparatus data are standard data described later. Various programs described later, such as a data matching program, apparatus state monitoring program and waveform comparison program, are stored in at least the storage part 215h. The error analysis information, the standard data and the various programs may be stored in the main controller storage part 222 or the temporary storage part 226 instead of the storage part 215h. The apparatus management controller 215 (and/or the data matching control part 215c, the apparatus state monitoring control part 215e and the communication part 215g) can execute a screen display program and thus control the operation display part 227 to create screen display data by processing the apparatus data into data for screen display and display the screen display data thereon.

<Data Matching Control Part 215c>

By executing the data matching program, the data matching control part 215c performs a tool matching function of copying a file of the apparatus 1, received from the main controller 201, into a file of the master apparatus 1-M or comparing a file of the apparatus 1 to a file of the master apparatus 1-M. In the present embodiment, the data matching control part 215c is configured to compare apparatus data of a process recipe before an error did not occur to the apparatus data of the process recipe after the error occurred.

In other words, the data matching control part 215c is configured to compare first apparatus data of the recipe executed without the error to second apparatus data of the recipe executed the error. More specifically, the data matching control part 215c compares waveform data of the apparatus data based on the first apparatus data and the second apparatus data, and displays the apparatus data on the operation display part 227 in descending order of the difference between the waveform data.

Figure 7B:
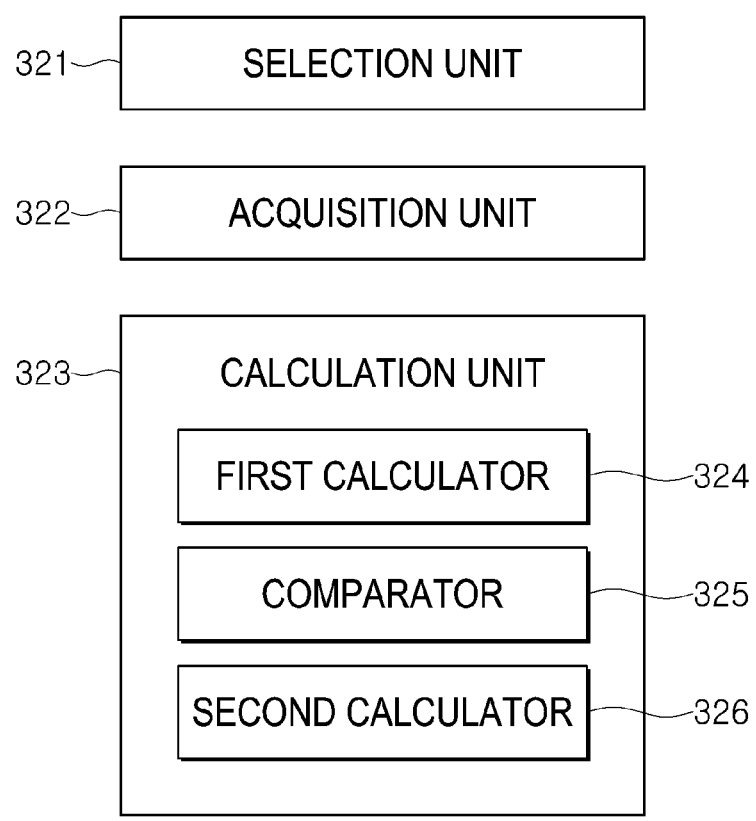
FIG. 7B is a diagram exemplifying a configuration of a data matching control part of the substrate processing apparatus according to the embodiment described herein.

As illustrated in FIG. 7B, the data matching control part 215c includes a selection unit 321, an acquisition unit 322 and a calculation unit 323. The selection unit 321 selects the apparatus data which was acquired when the recipe was executed without an occurrence of the error and the apparatus data being acquired when the error occurred. The acquisition unit 322 acquires the apparatus data of the recipe in which the error occurred and the apparatus data of the one or more recipes selected by the selection unit. The calculation unit 323 compares the apparatus data of the recipe in which the error occurred and the apparatus data of at least one of the recipe selected by the selection unit, for the apparatus data acquired by the acquisition unit 322, and calculates a difference therebetween. In the present embodiment, on the basis of data indicating that the error has occurred, the data matching control part 215c matches the first apparatus data acquired from the recipe executed before the occurrence of the abnormality and the second apparatus data acquired of at least one of the recipe executed at the time of the occurrence of the abnormality. Specifically, the selection unit 321 may select a recipe from the storage part 215h, the recipe being executed under the same processing condition as the recipe in which an error occurred, and select the apparatus data when the recipe was executed without the occurrence of the error under the same processing condition. The acquisition unit 322 may acquire the apparatus data from the recipe in which the error occurred and the recipe selected by the selection unit 321. In the present embodiment, the data matching control part 215c is configured to match the apparatus data acquired from the recipe executed before the occurrence of the error and at the time of the occurrence of the error, that is, the first apparatus data and second apparatus data, based on the data representing the occurrence of the error.

As illustrated in FIG. 7B, the calculation unit 323 may further include a first calculator 324 configured to calculate the absolute value of a difference between apparatus data, a comparator 325 configured to compare the absolute value and a threshold value and determine whether the apparatus data are matched with each other, and a second calculator 326 configured to calculate a standard deviation from the absolute value. The first calculator 324 calculates a matching rate between the first and second apparatus data, based on the determination result of the comparator 325.

<Apparatus State Monitoring Control Part 215e>

The apparatus state monitoring control part 215e executes the apparatus state monitoring program to perform the apparatus state monitoring function. The apparatus state monitoring control part 215e receives the apparatus data of the apparatus 1 from the main controller 201, and updates the apparatus data stored in the storage part 215h. Furthermore, the apparatus state monitoring control part 215e monitors the apparatus data of the apparatus 1, based on the standard data received from the master apparatus 1-M, that is, standard data as target data of the apparatus 1, the standard data including a time-dependent waveform, upper limit value and lower limit value of the temperature of a reaction chamber. That is, the apparatus state monitoring control part 215e monitors the apparatus data of the apparatus 1 while comparing the apparatus data of the apparatus 1 to the standard data. The standard data may correspond to one of the apparatus data.

In the present embodiment, the apparatus management controller 215 is installed separately from the main controller 201 having a substrate processing function and a report function for an upper device. However, the present embodiment is not limited to such a configuration. For example, the main controller 201 may directly generate various data from the collected apparatus data, the various data including data obtained by monitoring the state of the apparatus (apparatus state monitoring data), data obtained by evaluating the apparatus performance (evaluation item waveform data), data on error analysis (error analysis data), and data on alarm monitoring (fault information data).

<Apparatus State Monitoring Function>

Next, the apparatus state monitoring function according to the present embodiment, that is, the apparatus state monitoring program executed by the apparatus state monitoring control part 215e will be described with reference to FIG. 7A. The apparatus state monitoring program is stored in the memory (for example, storage part 215h) of the apparatus management controller 215. The apparatus state monitoring control part 215e is embodied by the apparatus state monitoring program.

As illustrated in FIG. 7A, the apparatus state monitoring control part 215e includes a setting unit 311, a band generation unit 312, a FDC (Fault Detection & Classification) monitoring unit 313, a counting display unit 314 and a diagnosis unit 315.

According to an input from the operation display part 227, such as an input of an operating command, the setting unit 311 instructs the band generation unit 312, the FDC monitoring unit 313 and the diagnosis unit 315 to set a designated band management.

The band generation unit 312 generates a band based on the standard data set by the setting unit 311, the upper-limit designated value and the lower-limit designated value. In the present embodiment, "band" indicates a range of data, which is flexibly set for the waveform obtained by the standard data (the apparatus data of the master apparatus 1-M). Specifically, the band indicates a range defined by designating the upper limit value or lower limit value or the upper and lower limit values, based on the values of data points constituting the standard data.

The FDC monitoring unit 313 includes a comparator 313a, a counter 313b and a determiner 313c. The comparator 313a compares the band generated by the band generation unit 312 to apparatus data which are generated moment by moment in the apparatus 1, and the counter 313b counts the number of times that the apparatus data is out of the band. When the count value is equal to or more than a predetermined number of times, the determiner 313c determines that an error occurred. When sensing the error, the FDC monitoring unit 313 may display information on the operation display part 227, the information representing that the error was sensed. As such, the FDC monitoring unit 313 monitors apparatus data by comparing the apparatus data received from the main controller 201 to the band which is generated based on the standard data serving as reference data for determining the apparatus data. The FDC monitoring unit 313 may further include the above-described band generation unit 312.

The counting display unit 314 is configured to display the number of missed points for each batch on the operation display part 227, the number of missed points being counted by the FDC monitoring unit 313. In the present embodiment, "missed point" indicates a data point which is out of the band, according to the comparison result between the band and the apparatus data.

The diagnosis unit 315 diagnoses statistical data of the apparatus data, based on the number of missed points, calculated through an error diagnosis rule. When diagnosing an error, the diagnosis unit 315 displays information on the operation display part 227, the information representing that the error was sensed.

The apparatus data collected by the apparatus state monitoring control part 215e are stored in the storage part 215h, but the configuration is not limited thereto. For example, the apparatus data may be stored in the main controller memory part 222.

Figure 8:
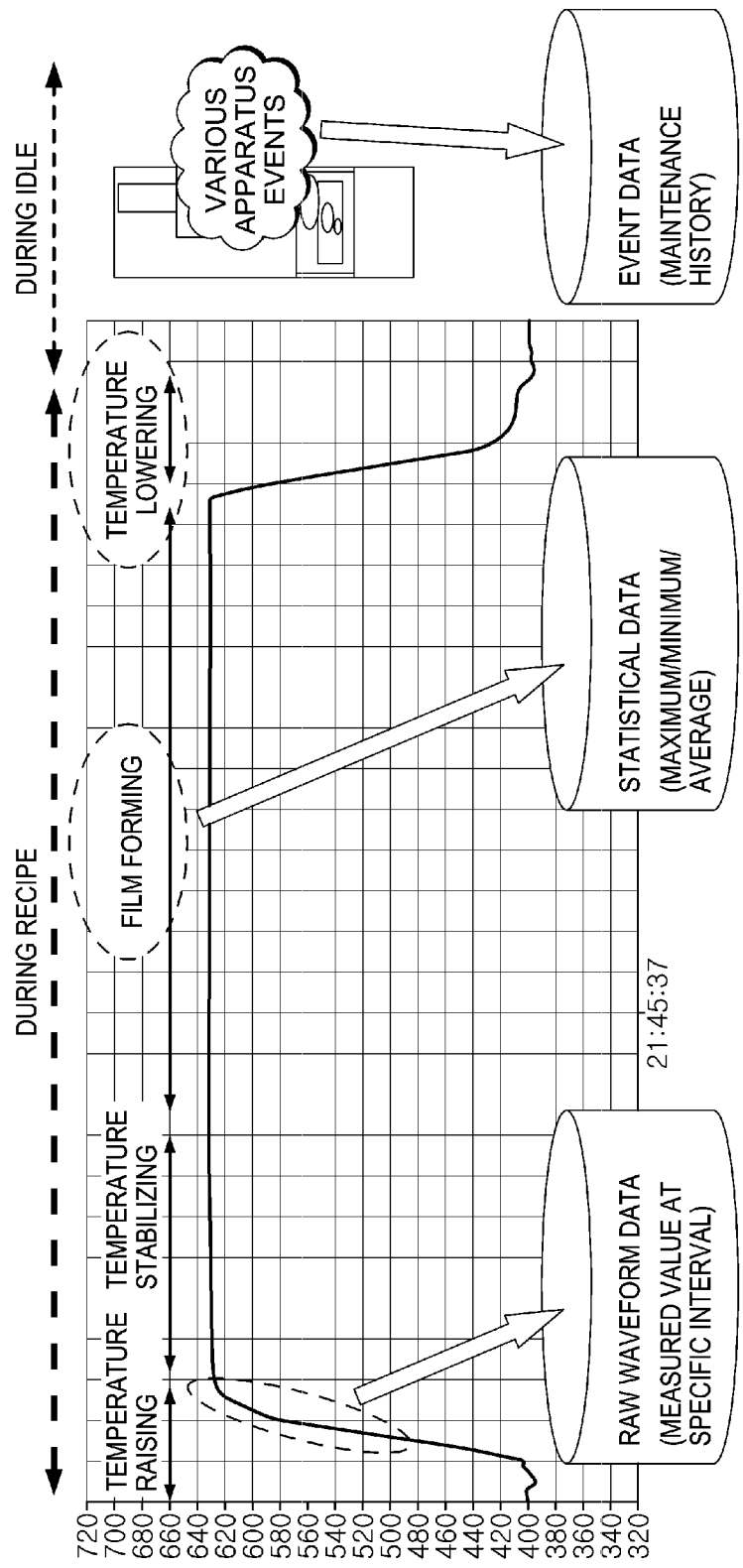
FIG. 8 is a diagram for describing apparatus data acquired by the apparatus state monitoring control part of the substrate processing apparatus according to the embodiment described herein.

As illustrated in FIG. 8, the apparatus state monitoring control part 215e executes the above-described apparatus state monitoring program to store apparatus data in the storage part 215h at each specific interval until a process recipe is ended. Furthermore, whenever each step is ended, the apparatus state monitoring control part 215e calculates statistics of the corresponding period, and store the calculated statistics as statistical data in the storage part 215h. The statistics may include the maximum value of the apparatus data, the minimum value of the apparatus data, and the average value of the apparatus data. Moreover, the apparatus state monitoring control part 215e stores event data containing maintenance information while the process recipe is not executed. The apparatus state monitoring control part 215e stores apparatus data in the storage part 215h, the apparatus data including not only a temperature rising waveform and decompression waveform which are raw waveform data, but also a heating temperature waveform of the supply pipe or exhaust pipe. For example, the possibility that a cold spot will occur and serve as a factor to cause a deposit of byproducts may be checked through the heating temperature waveform.

As illustrated in FIG. 9, when an error occurs in the recent apparatus 1 which holds many kinds of apparatus data (for example, 500 kinds of apparatus data), quite a long time is required to perform data analysis. Since the apparatus 1 holds a large amount of data, important apparatus data may be omitted depending on the skill of a maintenance engineer who performs data analysis. When the important data are omitted, a long time is required to specify the occurrence cause of the error. When the raw waveform data are compared with the naked eye, it is difficult to check a time-dependent change. Furthermore, since there is a difference between data which are gradually changed, it becomes difficult to specify the cause of the error. As a result, the downtime may be increased to degrade the operation rate of the apparatus.

<Analysis Support Process>

Figure 10:
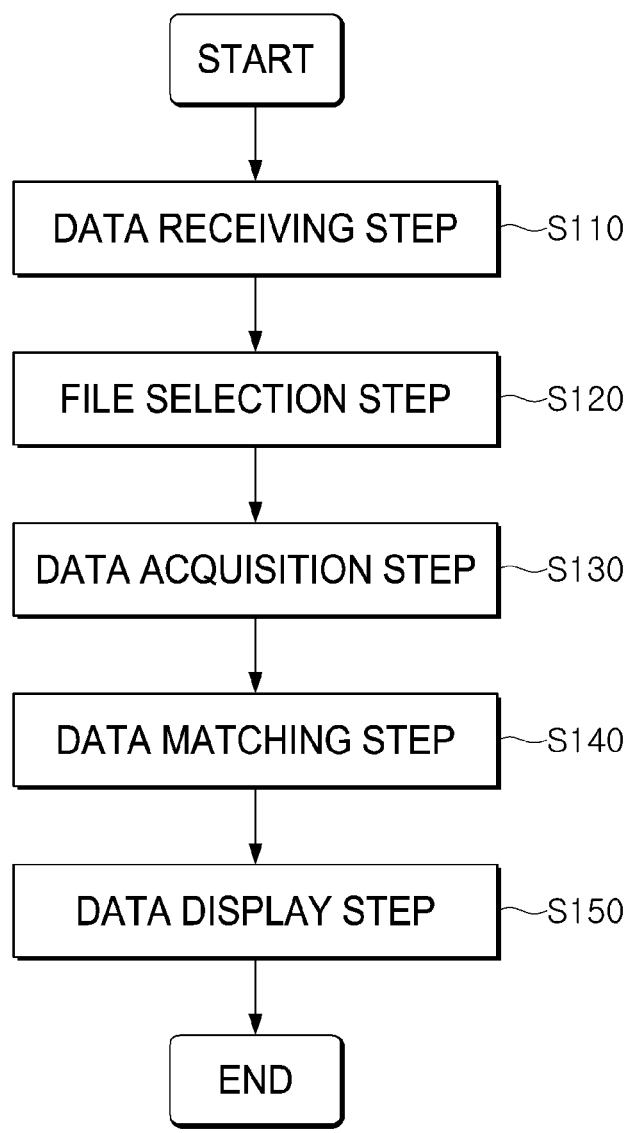
FIG. 10 is a flowchart exemplifying a process flow performed by the data matching control part of the substrate processing apparatus according to the embodiment described herein.

Next, an analysis support process flow using the data matching function (tool matching function) executed by the data matching control part 215c will be described with reference to FIG. 10.

<Data Receiving Step S110>

First, when receiving the error analysis information from the operating part 201 through the communication part 215g, the data matching control part 215c drives a waveform matching program. As described above, the selection unit 321 selects one or more recipe executed under a same condition as the recipe in which the error occurred from the storage part. The acquisition unit 322 acquires the apparatus data from each of the recipe in which the error occurred and the one or more recipe selected by the selection unit. The calculation unit 323 match the apparatus data from the recipe in which the error occurred and the apparatus data from the recipe selected by the selection unit for the apparatus data acquired by the acquisition unit 322.

In the present embodiment, the error analysis information includes at least information for specifying an error, that is, recipe specifying information for specifying a recipe executed by an apparatus 1 in which an error occurred. The data matching control part 215c may receive the error analysis information through the communication part 215g, depending on a condition inputted by an operator through the operation display part 227. The error analysis information may be set by an operator who inputs at least one condition among a threshold value, step, group and item, which are described later, through the operation display part 227.

<File Selection Step S120>

The data matching control part 215c acquires the recipe specifying information based on the received error analysis information. The data matching control part 215c searches for a recipe having the same processing condition as the acquired recipe specifying information by referring to production traceability information among the apparatus data stored in the storage part 215h. For example, the data matching control part 215c searches the plurality of recipes recorded in the production traceability information from the recipe in which the error occurred toward the past recipes. When detecting a recipe having the same processing condition by referring to the production traceability information, the data matching control part 215c acquires the start time and end time of the recipe, which are specified by the recipe specifying information. The data matching control part 215c may further acquire step information from the start time to the end time of each step constituting the recipe. As such, the data matching control part 215c selects a recipe which was executed under the same processing condition as the recipe in which the error occurred.

<Data Acquisition Step S130>

The data matching control part 215c reads apparatus data from the storage part 215h based on the step information acquired through the file selection step S120, the apparatus data being related to the recipe specifying information generated during a period from the start time to the end time of the step. Specifically, the data matching control part 215c acquires apparatus data for each of the recipe having an error therein and the recipe detected through search from the storage part 215h, the apparatus data being stored by the apparatus state monitoring control part 215e and defined in FIG. 9. The operation of acquiring data at each step is repeated until the recipe is ended.

The recent recipes include a large number of steps. For example, the number of steps may exceed 100. In this case, since the number of combinations between the steps and the kinds of items in the apparatus data illustrated in FIG. 9 exceeds 50,000 (=500×100), it is difficult to find which waveform is abnormal. Therefore, it is desirable to previously set which data to acquire when an error occurred, according to a condition inputted by an operator through the operation display part 227. Similarly, a group and item which are to be acquired in response to an error may be set in advance.

<Data Matching Step S140>

The data matching control part 215c compares the apparatus data of the recipe in which the error occurred, and the apparatus data to the apparatus data of the recipe which was detected through the search and acquires the recipe including the same processing condition as the recipe in which the error occurred, that is, the apparatus data at each step. Specifically, the data matching control part 215c calculates the absolute value of a difference between the apparatus data, that is, a difference between the apparatus data of the recipe in which the error occurred and the apparatus data to the apparatus data of the recipe which was detected through the search at each unit time, while adjusting the start times of the recipes based on the data time information related to the error analysis information. Then, the data matching control part 215c compares the absolute value and a threshold value at each unit time to determine whether the apparatus data are matched with each other, and calculates a matching rate between the apparatus data during a predetermined time period within the step. In the present embodiment, "matching rate" indicates a rate of periods having a difference of a predetermined value or more (for example, 3σ) with respect to a standard deviation σ calculated from a difference between apparatus data at each specific period. In the present embodiment, the specific period indicates a cycle at which apparatus data are collected. However, since even recipes having the same processing condition may have a difference in time period from the start time to the end time of the step, it is desirable to properly set the predetermined time period within the step.

Figure 11:
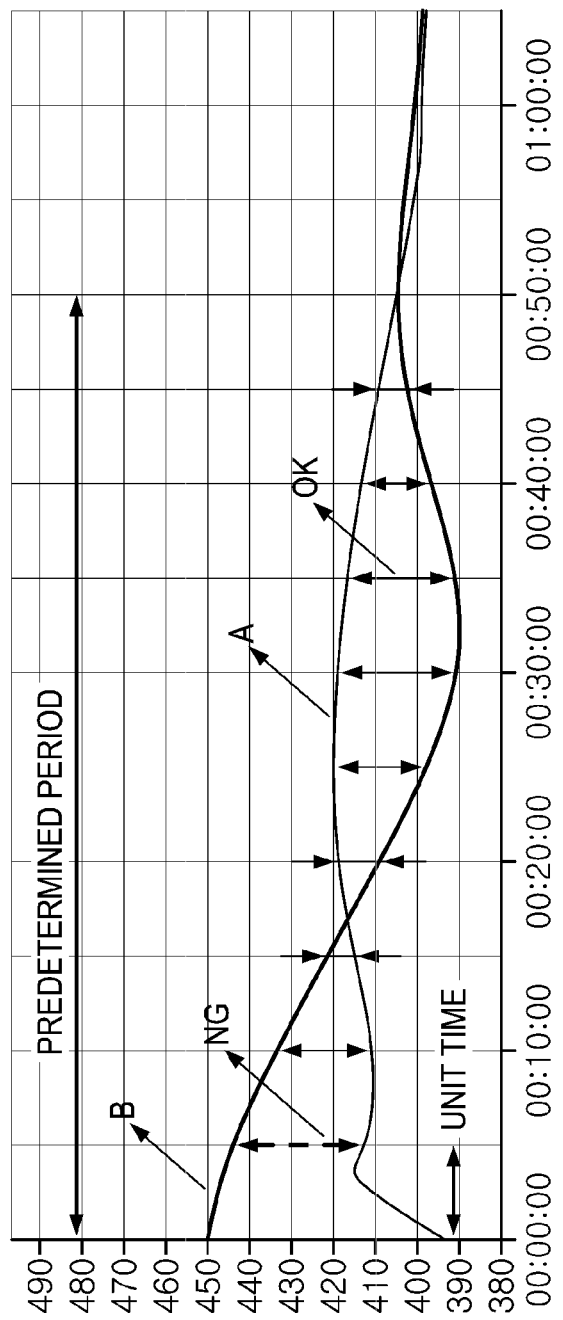
FIG. 11 is a diagram exemplifying an example for describing a matching rate in the substrate processing apparatus according to the embodiment described herein.

As illustrated in FIG. 11, the data matching control part 215c finds the absolute value of a difference between waveform data (for example, temperatures) at each unit time (five seconds in the example of FIG. 11) from two waveform data (apparatus data read from the recipe in which the error occurred and one or more recipe which was executed before the recipe in which the error occurred). The case in which the absolute value of the difference is equal to or more than the threshold value (for example, 30) is represented by a dotted line NG, and the case in which the absolute value of the difference is less than the threshold value is represented by a solid line OK. In this specification, the rate of the number of solid lines OK with respect to the number of data during a predetermined period (10 in the example of FIG. 11) is referred to as the matching rate. The number of solid lines OK may indicate the number of data which are determined to be matched through comparison (the number of data having a difference less than the threshold value). In FIG. 11, a recipe in which an error occurred is indicated by a line A, and a recipe which was performed before the recipe is indicated by a line B. Comparing the lines A and B, the matching rate at a predetermined period (00:00:00 to 00:50:00 in the example of FIG. 11) becomes 90%.

The threshold value may be set by an operator who inputs a condition through the operation display part 227. FIG. 11 separately displays only a part of the data in the recipes, in order to describe the process of calculating the matching rate.

In the present embodiment, the data matching control part 215c includes the second calculator 326 which calculates the absolute value of a difference between apparatus data within a predetermined period, and calculates a standard deviation from the absolute value. Specifically, the second calculator 326 is configured to calculate the absolute value of a difference between apparatus data at each unit time (for example, 0.1 or 1 second), and calculate the matching rate of the apparatus data and the standard deviation of the absolute value of the difference between the apparatus data at each step.

The second calculator 326 may update the threshold value using the calculated standard deviation. The calculation unit 323 is configured to compare the absolute value of the difference between the apparatus data to the calculated threshold value, and determine whether the apparatus data are matched with each other.

The threshold value illustrated in FIG. 11 is a fixed value set through a manual input, for example. Since there are many kinds of process data, a threshold value suitable for each of the kinds of process data may be preset through automatic calculation, for example. Specifically, an operator may input a condition through the operation display part 227, in order to designate whether to set the threshold value through automatic calculation or manually set the threshold value.

Figure 12:
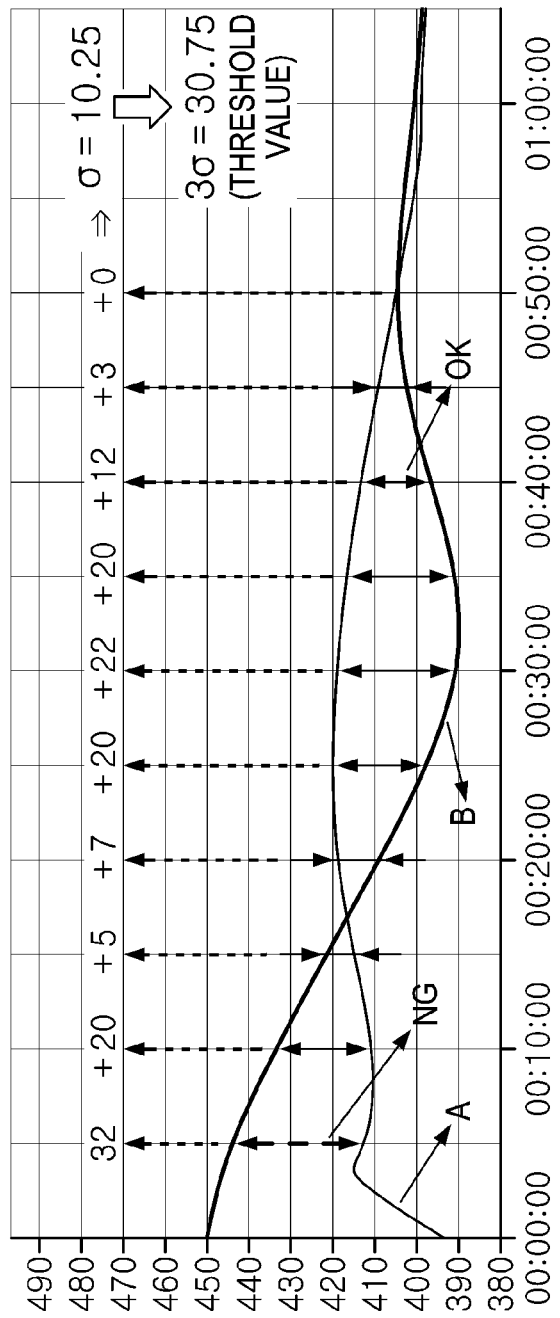
FIG. 12 is a diagram illustrating an example for describing a method for calculating a threshold value which is used to calculate a matching rate, in the substrate processing apparatus according to the embodiment described herein.

FIG. 12 illustrates an example for describing a method for calculating a threshold value. In FIG. 12, waveform data of lines A and B are the same as those of FIG. 11. For example, FIG. 12 illustrates a method for finding a waveform data matching rate through a process of finding a standard deviation σ of 10.25 from the absolute value of a difference (difference data) between the waveform data which are the comparison target, setting a value of three times the standard deviation, i.e. 3σ (30.75) to the threshold value, and considering difference data exceeding the threshold value as a mismatch (NG). When the threshold value is automatically set by the method illustrated in FIG. 12, an operator does not need to manually input the threshold value. However, the method can be used for waveform data of which the waveforms cross each other, but are not suitable for waveform data of which the waveforms do not cross each other, but are parallel to each other. Therefore, a threshold value which is automatically set by automatic calculation is basically used, but may be switched to a threshold value set through a manual input when the threshold value needs to be adjusted. Instead of 3σ (30.75), 2σ (20.5) may be used as the threshold value. Furthermore, the threshold value may be changed at each step. For example, the threshold value may be set to 3σ at the temperature raising step in which the temperature is significantly varied. On the other hand, the threshold value may be set to 2σ at the film forming step in which a temperature variation is comparatively stabilized.

When the recipes are compared as a whole, a step delay needs to be considered. For example, when a delay occurs at the temperature raising step such that the start of a subsequent step is delayed, a comparison result may be distorted because the shifted waveforms are compared. According to the present embodiment, the recipes are compared on a step basis. Therefore, even when a step is held because the end condition of the step is not satisfied, the recipes can be compared (matched).

The data matching step S140 may be configured to compare a recipe which was executed when an error occurred to recipes before and after the recipe, for all kinds and items of apparatus data. That is, the apparatus data of the recipe in which the error occurred may be compared to the apparatus data of a recipe in which no errors occurred. When the kind or item of apparatus data can be specified in response to the occurrence of the error, only sub data extracted in response to the specified kind or item of the apparatus data may be matched. The sub data include data selected from a group consisting of temperature data, pressure data, gas flow rate data, heater power data, concentration data and valve data, for example.

<Data Display Step S150>

The data matching control part 215c is configured to sequentially display apparatus data through the operation display part 227 in ascending order of matching rate, based on the matching rates which are calculated for all kinds and items of apparatus data. Referring to FIG. 13, the worst 10 data are displayed for the recipe which was executed when the error occurred and the recipe which was executed before the occurrence of the error. That is, the 10 data are sequentially displayed in ascending order of matching rate. However, the data matching control part 215c may be configured to sequentially display the apparatus data through the operation display part 227 in ascending order of matching rate for each group, each item or each step, instead of displaying the apparatus data as shown in FIG. 13. In the present embodiment, "group" indicates a data type such as temperature, pressure and gas flow rate, and "item" includes temperature data such as an actual temperature value of U zone, an actual temperature value of CU zone, an actual temperature value of C zone, an actual temperature value of CL zone and an actual temperature value of L zone, for example. Furthermore, "gas flow rate" indicates the channel number of an MFC, for example. The data matching control part 215c may be configured to distinguish and display apparatus data through the operation display part 227 depending on the matching rates. The data matching control part 215c may display apparatus data having a matching rate of less than 80% as a red color and display apparatus data having a matching rate of 80% or more as a blue color, through the operation display part 227. In the present embodiment, the worst 10 apparatus data are displayed in ascending order of matching rate with reference to FIG. 13, but the number of displayed apparatus data is not limited thereto.

As such, the data matching control part 215c is configured to display apparatus data through the operation display part 227 in ascending order of calculated matching rate. In other words, the data matching control part 215c displays the apparatus data through the operation display part 227 in descending order of difference. Thus, it is possible to easily determine at which step a trouble occurred and which apparatus data caused the trouble, thereby shortening the trouble analysis time while reducing an analysis mistake which may occur depending on the skill of a maintenance engineer.

Figure 19:
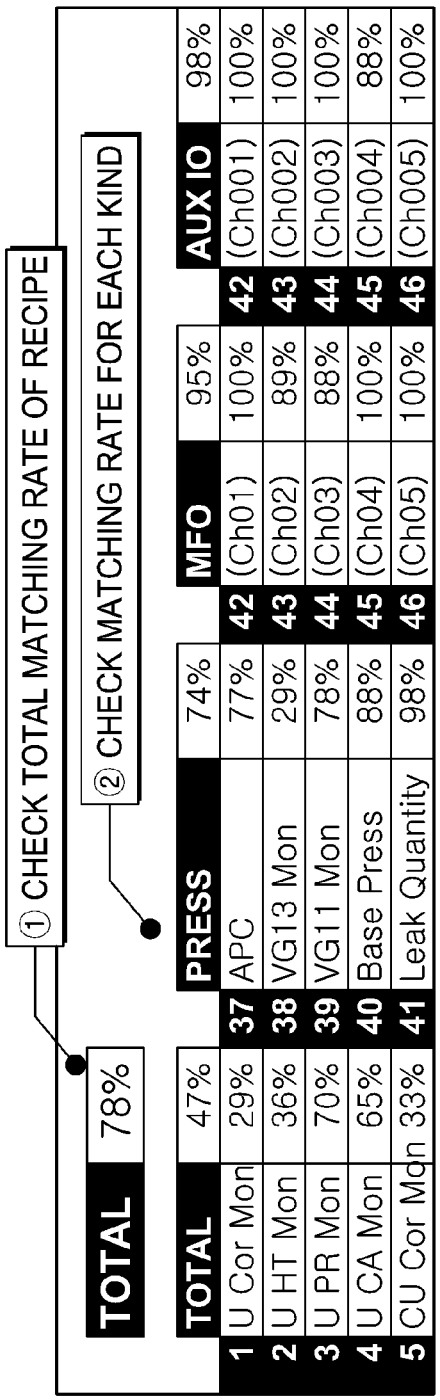
FIG. 19 exemplifies a recipe comparison result in the substrate processing apparatus according to the embodiment described herein.

As illustrated in FIG. 19, the result of the data matching step S140 may be displayed as a data detail check screen on the operation display part 227. At the top of the data detail check screen, the total matching rate of the recipe, represented by "TOTAL" in FIG. 19, is displayed. The total matching rate of the recipe is a value obtained by averaging the matching rates calculated from all kinds and items of data. Desirably, the total matching rate of the recipe may be set to a value equal to or more than 80%.

Furthermore, the matching rates for the respective kinds of data may be displayed under the total matching rate TOTAL in FIG. 19. Furthermore, a data detail check screen for each kind of data in FIG. 19 may be displayed. The data detail check screen of FIG. 19 may be displayed when a recipe is selected on a history reference screen described later.

As shown in FIG. 19, it is possible to estimate which kind of data (such as temperature and pressure) served as a factor to cause an error, through the data detail check screen. In the present embodiment, each of items having a matching rate of less than 50% may be displayed by a different color.

The data display step S150 according to the present embodiment displays a result obtained by matching two recipes, that is, a recipe which was executed when an error occurred and a recipe which was executed before the occurrence of the error. However, the present embodiment is not limited to such an example. In the present embodiment, the calculation results of matching rates obtained by matching the recipe executed when the error occurred with a plurality of recipes may be displayed in a time-series manner. For example, the total matching rate of apparatus data of the recipe, the total matching rate of apparatus data at a specific step and a matching rate of specific apparatus data may be collectively displayed. Thus, the change history of the matching rate until the error occurred can be checked.

According to the present embodiment, the case in which a recipe having the same processing condition as the recipe in which an error occurred is present in the storage part 215h of the apparatus 1 at the file selection step S120 has been described. However, the search result of the file selection step S120 may indicate that a recipe having the same processing condition as the recipe in which an error occurred is not present in the storage part 215h. Hereafter, such a case will be described.

When the data matching control part 215c searches the storage part 215h of the apparatus management controller 215 of the master apparatus 1-M and detects a recipe having the same processing condition as the recipe in which an error occurred, the data matching control part 215c receives the corresponding recipe file and a file related to the recipe file from the master apparatus 1-M, and stores the files in the storage part 215h of the apparatus 1 in which the error occurred. Since the subsequent steps are performed in the same manner as the present embodiment described above, the descriptions thereof are omitted herein. When there are no recipes having the same processing condition as the recipe in which the error occurred even though the data matching control part 215c searched the storage part 215h in the master apparatus 1-M, the data matching control part 215c searches the storage part 215h of the apparatus management controller 215 of another apparatus 1. On the other hand, when the data matching control part 215c searches the storage part 215h of the apparatus management controller 215 of another apparatus 1 and detects a recipe having the same processing condition as the recipe in which an error occurred, the data matching control part 215c receives the corresponding recipe file and a file related to the recipe file from the apparatus 1, and stores the files in the storage part 215h of the apparatus 1 in which the error occurred. Since the subsequent steps are performed in the same manner as the present embodiment described above, the descriptions thereof are omitted herein. When a recipe including the same processing condition is not detected even though the storage part 215h of the apparatus management controllers 215 of the other apparatuses 1 were searched, it may indicate that there is a clear incorrect setting. Therefore, the data matching control part 215c determines that the parameters are not set correctly.

According to the present embodiment, the following one or more effects can be obtained.

(a) The data matching control part 215c according to the present embodiment may extract apparatus data before and after an error occurred, by referring to the error analysis information, and display the apparatus data on the screen in ascending order of matching rate or descending order of difference therebetween. Therefore, although a maintenance engineer with a low skill performs error analysis while spending a long time in analyzing a plurality of apparatus data, the data can be efficiently analyzed. Thus, it is possible to shorten a downtime when the error occurred.

(b) The data matching control part 215c according to the present embodiment may extract apparatus data before and after an error occurred, by referring to the error analysis information, and display the apparatus data on the screen in descending order of difference therebetween. Therefore, it is possible to reduce the burden of a maintenance engineer who performs error analysis, while shortening a time required for the maintenance engineer to analyze the cause of the error.

(c) The data matching control part 215c according to the present embodiment may extract apparatus data before and after an error occurred, and display the apparatus data on the screen in descending order of difference therebetween. Therefore, although a maintenance engineer made a mistake (for example, an input mistake for a setting value of apparatus data), it is possible to shorten a time required for specifying the cause of an error. In particular, one of the causes of errors at the film forming step is an incorrect setting. According to the present embodiment, it is possible to shorten a time required for specifying the cause of an error, even when an incorrect setting was conducted.

(d) The data matching control part 215c according to the present embodiment may display the matching results of the apparatus data on the screen in a time-series manner from the point of time that the recipe in which the error occurred was executed. Therefore, it is possible to check the time-dependent change of the apparatus data by reviewing the change history of the matching rate until the error occurred, thereby shortening a time required for a maintenance personnel to analyze the causes of the error.

Another Embodiment

Next, the file (data) matching function, that is, the tool matching function during an apparatus setup by the data matching control part 215c will be described with reference to FIGS. 14 to 19. The present embodiment is different from the flow illustrated in FIG. 10 in that the comparison targets are files owned by the repeat apparatuses 1-1 to 1-6 and the master apparatus 1-M, respectively. Since the other processes are performed in the same manner as those performed by the data matching control part 215c through the flow illustrated in FIG. 10, the detailed descriptions are omitted herein.

In the present embodiment, each of the data matching control part 215c of the repeat apparatuses 1-1 to 106 may directly acquire necessary apparatus data from the master apparatus 1-M, while directly communicating with the data matching control part 215c of the master apparatus 1-M. In the present embodiment, the data matching control part 215c performs a program to realize the tool matching function. Without a host computer which is a kind of management device or upper computer, the data matching control part 215c may match a file used in each of the repeat apparatuses 1-1 to 1-6 with a file which is already used in the master apparatus 1-M.

Figure 14:
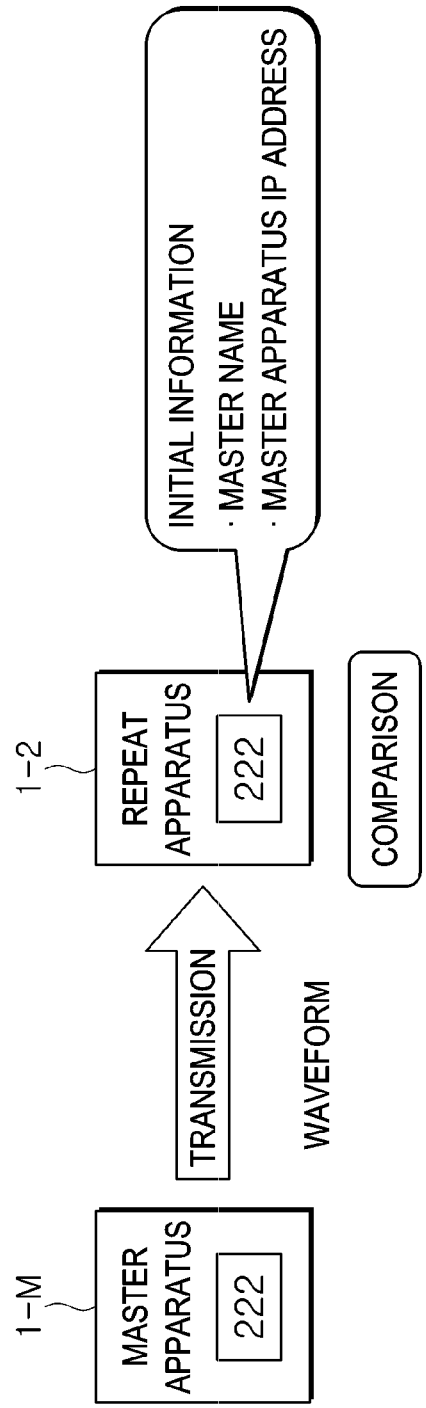
FIG. 14 is a diagram illustrating an example for describing a file comparison function, in a substrate processing apparatus according to another embodiment described herein.

As illustrated in FIG. 14, the main controller storage part 222 of the repeat apparatus 1-2 among the repeat apparatuses 1-1 to 1-6, for example, may store the name and IP (Internet Protocol) address of the master apparatus 1-M, which are stored as the initial information. The name and IP address of the master apparatus 1-M may be directly set by an operator through the operation display part 227 of the repeat apparatus 1-2, or transmitted to the repeat apparatus 1-2 form the master apparatus 1-M. The reason that two pieces of information such as the name and IP addresses of the master apparatus 1-M are used when the repeat apparatus 1-2 is connected to the master apparatus 1-M is because the name of the master apparatus 1-M is compared after the repeat apparatus 1-2 established a communication connection to the master apparatus 1-M through the IP address. Thus, it is possible to prevent an incorrect connection which may occur when the IP address is incorrectly set. The operator can perform a matching (data matching) operation without being aware of the master apparatus 1-M.

In the data matching control illustrated in FIG. 14, the data matching control part 215c of the apparatus 1 including the repeat apparatus 1-2 reads a recipe file or parameter file from the main controller storage part 222 of the master apparatus 1-M, stores the read file in the main controller storage part 222 of the apparatus 1, and compares (matches) the file. In the present embodiment, the recipe file of the master apparatus 1-M is compared and matched with the recipe file of the apparatus 1. The recipe file received from the master apparatus 1-M may not be stored in the main controller storage part 222, but stored in the storage part 215h of the apparatus 1. Then, the recipe file of the master apparatus 1-M, stored in the storage part 215h of the apparatus 1, may be matched with the recipe file of the apparatus 1.

FIG. 15 shows an example of a table defining waveforms for performance evaluation. The table may be previously registered in the master apparatus 1-M. For example, a maximum of 20 waveforms may be registered. After the first-made apparatus of the apparatus, that is, the master apparatus 1-M was delivered, a user can acquire the optimal parameters while operating the apparatus 1, and manage the acquired parameters as know-how. In order to adjust the performance of the apparatus 1 to the performance of the master apparatus 1-M during a setup operation, waveform data which are a comparison (matching) target related to performance may be defined as shown in FIG. 15. The waveform data as the comparison (matching) target may include specific waveform data such as a temperature rising waveform to 1200° C. and a decompression waveform to 2 Pa. Waveform data which are not related to the performance of the apparatus 1 are not the matching target. For example, the waveform data which are not related to the performance of the apparatus 1 may include temperature waveform data when a pipe is heated, which is not defined in the table of FIG. 15. Through the table shown in FIG. 15, the setup operation can be efficiently performed.

FIG. 16 shows an example of a history reference screen which is displayed when an operator pushes a button for referring to a history of data matching (tool matching) on a menu screen (not illustrated). FIG. 17 shows a data matching detail check screen which is displayed when the temperature is selected on the history reference screen of FIG. 16.

FIG. 17 shows the number of steps having a matching rate of 80% or more and the number of steps having a matching rate of less than 80% among all steps of a process recipe (for example, 20 steps). The matching rates of the respective items U, CU, C, CL and L may be displayed for each step unit of the process recipe. When the matching rate marked at the bottom of FIG. 17 is 84%, it may indicate that the total matching rate of the apparatus data on the temperature in the recipe is 84%. That is, the matching rate marked at the bottom of FIG. 17 is an average value obtained by averaging the matching rates calculated for the respective times at each step unit.

Referring to FIG. 17, the cases in which the matching rate is equal to or more than 80% and the cases in which the matching rate is less than 80% are displayed so as to be easily distinguished from each other. Therefore, it is possible to easily check at which step and item the matching rate is lowered. When a button Trace for displaying raw waveform data is pushed, raw waveform data illustrated in FIG. 18 may be displayed.

Figure 18:
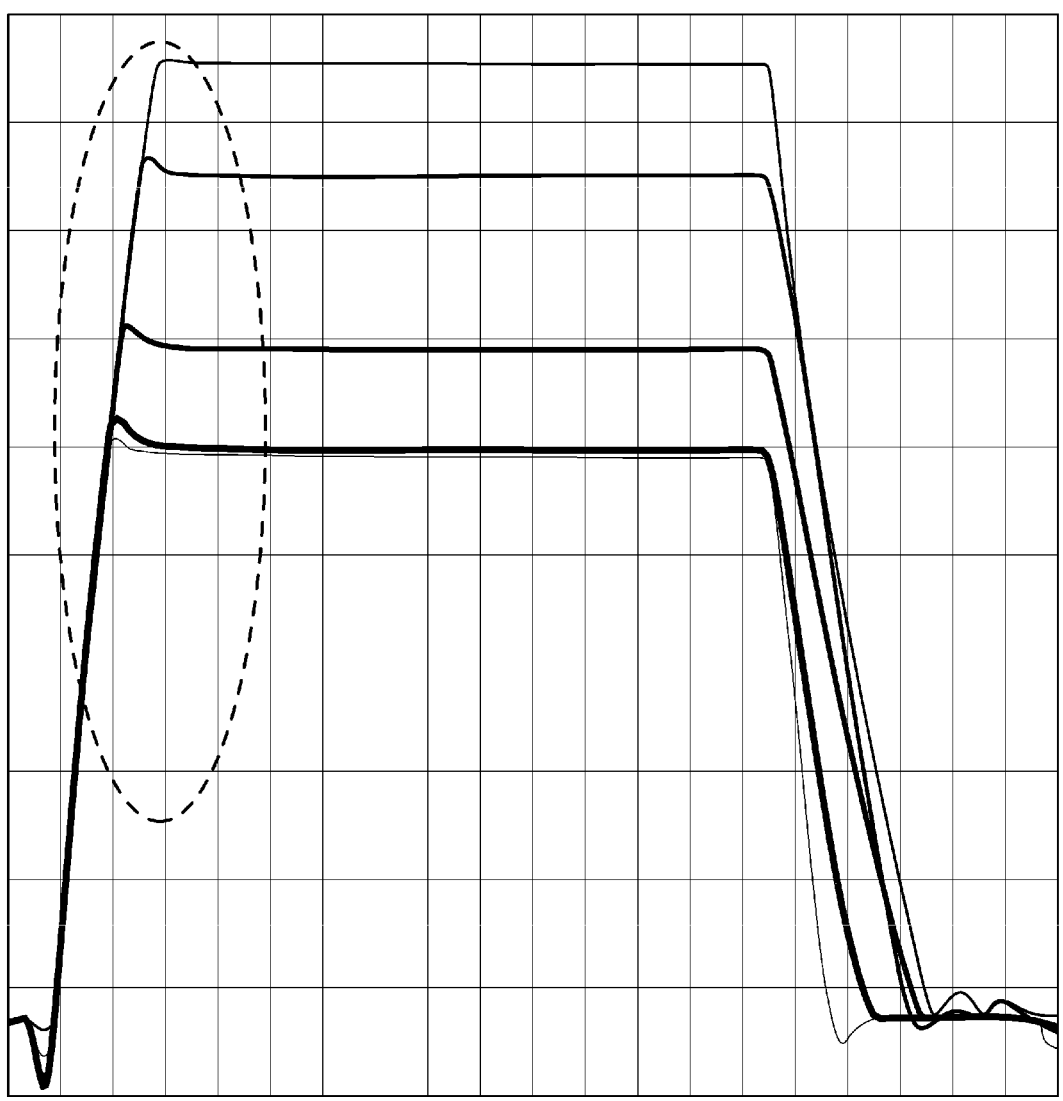
FIG. 18 is a diagram exemplifying raw waveform data in the substrate processing apparatus according to the embodiment described herein.

Referring to FIG. 18, the raw waveform data of the respective items U, CU, C, CL and L of the process file of the master apparatus 1-M and the raw waveform data of the respective items U, CU, C, CL and L of the process file of the apparatus 1 may be displayed for a preset step.

As such, the raw waveform data can be compared for even an item having a low matching rate.

According to the present embodiment, the following one or more effects are obtained.

(a) The data matching control art 215c according to the present embodiment cam calculate a matching rate at each step unit of the process recipe, and easily extract apparatus having a low matching rate among the respective items (actual temperature value of U zone) of the multiple kinds of data (temperature and gas). Thus, only information on the performance of the apparatus can be displayed, which makes it possible to reduce the downtime during the setup.

(b) The data matching control part 215c according to the present embodiment can calculate a matching rate at each step of the process recipe, and easily extract apparatus having a low matching rate among the respective items (actual temperature value of U zone) of the multiple kinds of data (temperature and gas). Thus, the data matching control part 215c can reduce the burden of an operator who performs the setup operation, and shorten the time required for the operator to perform the setup operation.

The substrate processing apparatus 1 according to the above described embodiment has been described based on a semiconductor manufacturing apparatus for manufacturing a semiconductor. However, the above described technique may be applied not only to the semiconductor manufacturing apparatus, but also an apparatus for processing a glass substrate, such as an LCD device. The above described technique may be applied to various substrate processing apparatuses such as an exposure apparatus, a lithography device, an application apparatus and a processing apparatus using plasma.

According to the technique described herein, it is possible to shorten a time required for analyzing an error of an apparatus in which the error occurred, while shortening a downtime of the apparatus.

What is claimed is:

1. A substrate processing apparatus comprising:
   a process chamber where a substrate to be processed is placed;
   a storage part configured to store apparatus data being required while a recipe for processing the substrate is executed; and
   a data matching control part configured to match the apparatus data stored in the storage part, wherein the data matching control part comprises:
      a selection unit configured to select one or more recipes executed under the same condition as a recipe executed with an error from the storage part;
      an acquisition unit configured to acquire the apparatus data of the recipe executed with the error and the apparatus data of the one or more recipes selected by the selection unit; and
      a calculation unit configured to compare the apparatus data of the recipe executed with the error and the apparatus data of at least one among the recipes selected by the selection unit, wherein the calculation unit comprises:
         a first calculator configured to calculate an absolute value of a difference between the apparatus data of the recipe executed with the error and the apparatus data of the at least one among the recipes selected by the selection unit per unit time within a predetermined constant period; and
         a comparison part configured to compare the absolute value to a threshold value and determine whether the apparatus data of the recipe executed with the error and the apparatus data of the at least one among the recipes selected by the selection unit are matched,
      wherein the first calculator calculates a matching rate between the apparatus data of the recipe executed with the error and the apparatus data of the at least one among the recipes selected by the selection unit based on a determination result of the comparison part, and
      and wherein the first calculator calculates the matching rate by calculating a ratio of (i) a matched number which is equal to a number of times that the absolute value of the difference between the apparatus data of the recipe executed with the error and the apparatus data of the at least one among the recipes selected by the selection unit is measured to be less than the threshold value within the predetermined constant period to (ii) a total number of times that the absolute value of the difference between the apparatus data of the recipe executed with the error and the apparatus data of the at least one among the recipes selected by the selection unit is measured within the predetermined constant period.

2. The substrate processing apparatus of claim 1, further comprising a display device configured to display a result of matching the apparatus data of the recipe executed with the error and the apparatus data of the at least one among the recipes selected by the selection unit,
   wherein the display device is further configured to display the apparatus data in descending order of the difference between the recipe executed with the error and the recipes selected by the selection unit.

3. The substrate processing apparatus of claim 1, wherein the calculation unit further comprises a second calculator configured to calculate a standard deviation of the absolute value of the difference between the apparatus data of the recipe executed with the error and the apparatus data of the at least one among the recipes selected by the selection unit within the predetermined constant period, and calculate the threshold value using the standard deviation, and
   the comparison part compares the absolute value to the threshold value calculated by the second calculator, and determines whether the apparatus data of the recipe executed with the error and the apparatus data of the at least one among the recipes selected by the selection unit are matched with each other.

4. The substrate processing apparatus of claim 1, wherein the recipe comprises a plurality of steps, and
   the calculation unit calculates the absolute value of the difference between the apparatus data of the recipe executed with the error and the apparatus data of the at least one among the recipes selected by the selection unit per unit time, and calculates (i) the matching rate between the apparatus data of the recipe executed with the error and the apparatus data of the at least one among the recipes selected by the selection unit and (ii) a standard deviation of the absolute value for each of the steps.

5. The substrate processing apparatus of claim 1, wherein the data matching control part is configured to:
   acquire error analysis information from the storage part;

adjust a start time of each of the one or more recipes, based on time information contained in the error analysis information;

calculate the absolute value of the difference between the apparatus data of the recipe executed with the error and the apparatus data of the at least one among the recipes selected by the selection unit per unit time;

determine whether the apparatus data of the recipe executed with the error and the apparatus data of the at least one among the recipes selected by the selection unit are matched with each other, by comparing the absolute value to the threshold value per unit time;

and calculate the matching rate between the apparatus data of the recipe executed with the error and the apparatus data of the at least one among the recipes selected by the selection unit within the predetermined constant period.

6. The substrate processing apparatus of claim 1, wherein the data matching control part is configured to access the storage part, read a plurality of the recipes executed under the same conditions as the recipe executed with the error, acquire two or more apparatus data which were acquired when the recipe was executed, and calculate matching rates between the apparatus data which were acquired when the recipe was executed without an occurrence of the error and the apparatus data which were acquired when the recipe was executed with the occurrence of the error.

7. The substrate processing apparatus of claim 6, further comprising a display device configured to display the matching rates for each batch in which the recipe is executed.

8. The substrate processing apparatus of claim 7, wherein the data matching control part is further configured to display on the display device a matching rate between sub-data contained in any one of the two or more apparatus data and sub-data contained in the apparatus data.

9. The substrate processing apparatus of claim 8, wherein the sub-data is selected from a group consisting of temperature data, pressure data, gas flow rate data, heater power data, concentration data and valve data.

10. The substrate processing apparatus of claim 1, wherein the data matching control part is further configured to access an external substrate processing apparatus and acquire from the external substrate processing apparatus the recipe executed under the same conditions as the recipe executed with the error when the recipes executed under the same conditions as the recipe executed with the error occurred are not stored in the storage part.

11. The substrate processing apparatus of claim 1, wherein the first calculator calculates the matching rate by calculating the ratio of the matched number to the total number of times within the predetermined constant period without using the matched number or the total number counted after the predetermined constant period elapses.

12. An apparatus management controller connected to a substrate processing apparatus accommodating a substrate to be processed, comprising:

an apparatus state monitoring control part configured to store apparatus data in a storage part, the apparatus data being acquired while a recipe for processing the substrate is executed; and a data matching control part configured to match the apparatus data stored in the storage part, the data matching control part comprises:

a selection unit configured to select one or more recipes executed under the same condition as a recipe executed with an error from the storage part;

an acquisition unit configured to acquire the apparatus data of the recipe executed with the error and apparatus data of the one or more recipes selected by the selection unit; and a calculation unit configured to compare the apparatus data of the recipe executed with the error and the apparatus data of at least one among the recipes selected by the selection unit, wherein the calculation unit comprises:

a first calculator configured to calculate an absolute value of a difference between the apparatus data of the recipe executed with the error and the apparatus data of the at least one among the recipes selected by the selection unit per unit time within a predetermined constant period; and a comparison part configured to compare the absolute value to a threshold value and determine whether the apparatus data of the recipe executed with the error and the apparatus data of the at least one among the recipes selected by the selection unit are matched, wherein the first calculator calculates a matching rate between the apparatus data of the recipe executed with the error and the apparatus data of the at least one among the recipes selected by the selection unit based on a determination result of the comparison part, and wherein the first calculator calculates the matching rate by calculating a ratio of (i) a matched number which is equal to a number of times that the absolute value of the difference between the apparatus data of the recipe executed with the error and the apparatus data of the at least one among the recipes selected by the selection unit is measured to be less than the threshold value within the predetermined constant period to (ii) a total number of times that the absolute value of the difference between the apparatus data of the recipe executed with the error and the apparatus data of the at least one among the recipes selected by the selection unit is measured within the predetermined constant period.

* * * * *